United States Patent
Orihashi et al.

(10) Patent No.: US 12,073,023 B2
(45) Date of Patent: Aug. 27, 2024

(54) TACTILE PRESENTATION APPARATUS, TACTILE PRESENTATION SYSTEM, TACTILE PRESENTATION CONTROL METHOD, AND PROGRAM

(71) Applicant: Sony Group Corporation, Tokyo (JP)

(72) Inventors: Masaki Orihashi, Tokyo (JP); Masahiro Sato, Tokyo (JP); Hironobu Abe, Tokyo (JP); Akihito Nishiike, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/017,511

(22) PCT Filed: Mar. 29, 2021

(86) PCT No.: PCT/JP2021/013195
§ 371 (c)(1),
(2) Date: Jan. 23, 2023

(87) PCT Pub. No.: WO2022/054323
PCT Pub. Date: Mar. 17, 2022

(65) Prior Publication Data
US 2023/0259211 A1    Aug. 17, 2023

(30) Foreign Application Priority Data
Sep. 9, 2020   (JP) ................. 2020-151632

(51) Int. Cl.
*G06F 3/01*    (2006.01)
*G06F 3/041*   (2006.01)

(52) U.S. Cl.
CPC ............ *G06F 3/016* (2013.01); *G06F 3/0414* (2013.01); *G06F 2203/0382* (2013.01);
(Continued)

(58) Field of Classification Search
None
See application file for complete search history.

(56) References Cited

U.S. PATENT DOCUMENTS 6,639,582 B1 * 10/2003 Shrader .............. G06F 3/016
345/173
8,976,112 B2 * 3/2015 Birnbaum ........... G06F 3/0346
345/173
(Continued)

FOREIGN PATENT DOCUMENTS

DE    112018004879 T5    6/2020
JP    2010015551 A       1/2010
(Continued)

OTHER PUBLICATIONS

International Search Report from corresponding PCT application PCT/JP2021/013195, dated May 25, 2021.

*Primary Examiner* — Dorothy Harris
(74) *Attorney, Agent, or Firm* — K&L Gates LLP

(57) ABSTRACT

[Object] To provide a technology that enables one user to appropriately recognize a tactile sensation based on a force from the other user.
[Solving Means] A tactile presentation apparatus according to the present technology includes a first detection unit, a first presentation unit, and a control unit. The first detection unit detects a first detection value based on a force of a first user. The first presentation unit is provided at a position other than a position of the first detection unit and presents a tactile sensation to the first user. The control unit controls the first presentation unit to present a tactile sensation to the first user on the basis of a second detection value of another tactile presentation apparatus, the other tactile presentation apparatus including a second detection unit that detects a
(Continued)

second detection value based on a force of a second user and a second presentation unit that presents a tactile sensation to the second user.

22 Claims, 23 Drawing Sheets

(52) U.S. Cl.
CPC .............. *G06F 2203/04104* (2013.01); *G06F 2203/04105* (2013.01); *G06F 2203/04114* (2019.05)

(56) References Cited

U.S. PATENT DOCUMENTS

| | | | |
|---|---|---|---|
| 2005/0235032 A1* | 10/2005 | Mason, III | H04L 12/1813 709/204 |
| 2008/0059138 A1* | 3/2008 | Tremblay | G06F 3/011 703/11 |
| 2009/0096746 A1* | 4/2009 | Kruse | G06F 3/016 340/407.1 |
| 2009/0156309 A1* | 6/2009 | Weston | G06F 3/014 2/167 |
| 2009/0195512 A1* | 8/2009 | Pettersson | H04M 1/0202 345/173 |
| 2011/0157088 A1* | 6/2011 | Motomura | G06F 3/016 702/19 |
| 2012/0193211 A1* | 8/2012 | Ciesla | G06F 3/0202 200/81 H |
| 2013/0227411 A1* | 8/2013 | Das | H04M 3/42382 715/702 |
| 2014/0160063 A1* | 6/2014 | Yairi | G06F 3/04886 345/173 |
| 2015/0022328 A1* | 1/2015 | Choudhury | G06F 1/163 340/12.5 |
| 2019/0250710 A1* | 8/2019 | Yi | A63F 13/28 |
| 2021/0339127 A1* | 11/2021 | Ito | G06F 3/016 |

FOREIGN PATENT DOCUMENTS

| | | |
|---|---|---|
| JP | 2015520455 A | 7/2015 |
| JP | 2015142145 A | 8/2015 |
| JP | 2019198923 A | 11/2019 |

\* cited by examiner

TACTILE PRESENTATION APPARATUS, TACTILE PRESENTATION SYSTEM, TACTILE PRESENTATION CONTROL METHOD, AND PROGRAM

TECHNICAL FIELD

The present technology relates to a technology such as a tactile presentation apparatus in tactile communication.

BACKGROUND ART

Communication methods for users located remotely from each other are a telephone, a video phone call, and so on. However, the methods such as the telephone and the video phone call have a problem in that they cannot provide a sufficient realistic sensation as if the users faced each other.

Therefore, Patent Literature 1 below has disclosed a method in which the users communicate with each other remotely using a tactile sensation.

According to the technology disclosed in Patent Literature 1, robot hands are respectively provided near monitors in a video phone call. According to this technology, when one user shakes hands with one robot hand, the other robot hand is driven to grip the hand of the other user with a force depending on that hand shake force.

CITATION LIST

Patent Literature

Patent Literature 1: Japanese Patent Application Laid-open No. 2015-142145

DISCLOSURE OF INVENTION

Technical Problem

In such a field, it is desirable to provide a technology in which one user can appropriately recognize a tactile sensation based on a force from the other user.

In view of the above-mentioned circumstances, it is an objective of the present technology to provide a technology that enables one user to appropriately recognize a tactile sensation based on a force from the other user.

Solution to Problem

A tactile presentation apparatus according to the present technology includes a first detection unit, a first presentation unit, and a control unit.

The first detection unit detects a first detection value based on a force of a first user.

The first presentation unit is provided at a position other than a position of the first detection unit and presents a tactile sensation to the first user.

The control unit controls the first presentation unit to present a tactile sensation to the first user on the basis of a second detection value of another tactile presentation apparatus, the other tactile presentation apparatus including a second detection unit that detects a second detection value based on a force of a second user and a second presentation unit that presents a tactile sensation to the second user.

In this tactile presentation apparatus, the first detection unit and the first presentation unit are provided at different positions. Therefore, the first (one) user can appropriately recognize a tactile sensation based on a force from the second (other) user.

A tactile presentation system according to the present technology includes a tactile presentation apparatus and another tactile presentation apparatus.

The tactile presentation apparatus includes a first detection unit, a first presentation unit, and a control unit.

The first detection unit detects a first detection value based on a force of a first user.

The first presentation unit is provided at a position other than a position of the first detection unit and presents a tactile sensation to the first user.

The control unit controls the first presentation unit to present a tactile sensation to the first user on the basis of a second detection value of another tactile presentation apparatus, the other tactile presentation apparatus including a second detection unit that detects a second detection value based on a force of a second user and a second presentation unit that presents a tactile sensation to the second user.

A tactile presentation control method according to the present technology includes
  in a tactile presentation apparatus including a first detection unit that detects a first detection value based on a force of a first user and a first presentation unit that is provided at a position other than a position of the first detection unit and presents a tactile sensation to the first user,
  controlling the first presentation unit to present a tactile sensation to the first user on the basis of a second detection value of another tactile presentation apparatus, the other tactile presentation apparatus including a second detection unit that detects a second detection value based on a force of a second user and a second presentation unit that presents a tactile sensation to the second user.

A program according to the present technology causes a tactile presentation apparatus including a first detection unit that detects a first detection value based on a force of a first user and a first presentation unit that is provided at a position other than a position of the first detection unit and presents a tactile sensation to the first user to perform processing including
  controlling the first presentation unit to present a tactile sensation to the first user on the basis of a second detection value of another tactile presentation apparatus, the other tactile presentation apparatus including a second detection unit that detects a second detection value based on a force of a second user and a second presentation unit that presents a tactile sensation to the second user.

MODE(S) FOR CARRYING OUT THE INVENTION

Hereinafter, embodiments according to the present technology will be described with reference to the drawings.

First Embodiment

<Overall Configuration and Configurations of Respective Units>

Figure 1:
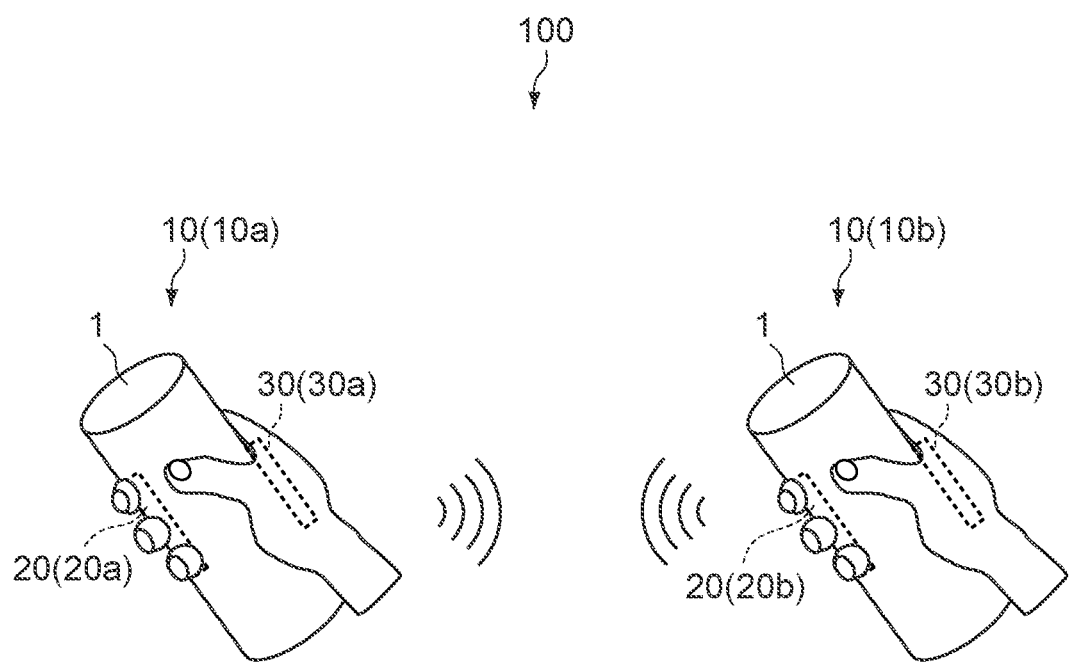
FIG. 1 A diagram showing a tactile presentation system according to a first embodiment.
Figure 2:
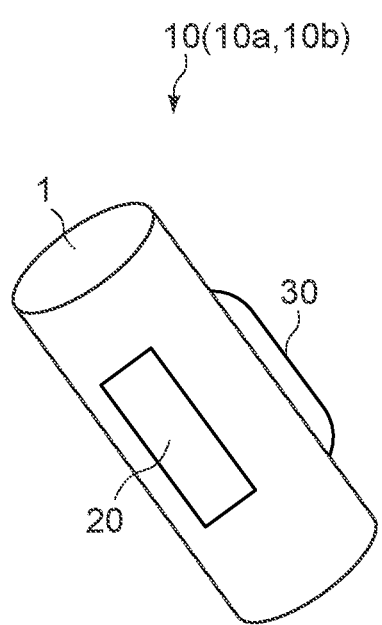
FIG. 2 A diagram showing a tactile presentation apparatus in the tactile presentation system.

FIG. 1 is a diagram showing a tactile presentation system 100 according to a first embodiment of the present technology. FIG. 2 is a diagram showing a tactile presentation apparatuses 10 in the tactile presentation system 100.

The tactile presentation system 100 according to the present embodiment is a system that enables a plurality of users to perform tactile communication with each other even in a case where they are located remotely from each other.

As shown in FIG. 1, the tactile presentation system 100 includes a plurality of tactile presentation apparatuses 10 each having a similar configuration. The tactile presentation apparatuses 10 are used by different users, respectively.

In the present embodiment, a case where the number of tactile presentation apparatuses 10 is two will be described. However, the number of tactile presentation apparatuses 10 may be three or more (as will be described later, some of them may be virtual tactile presentation apparatuses (tactile presentation apparatuses merely displayed on a screen)). Similarly, the number of users is not limited to two, and may be three or more (as will be described later, some of them may be virtual people (comic characters, virtual idols, and the like displayed on the screen)).

The tactile presentation apparatus 10 includes a casing 1, a detection unit 20 that is provided on the casing 1 and detects a user force, and a presentation unit 30 that is provided at a position on the casing 1, which is different from that of the detection unit 20, and presents a tactile sensation to a user.

The casing 1 is set to have such a size that the user can hold it with one hand. In the present embodiment, the shape of the casing 1 is a cylindrical shape with both ends closed. However, the shape of the casing 1 is not limited thereto. For example, the casing 1 may be configured to be a polygonal columnar shape such as a triangular or rectangular columnar shape or may be a shape like a human hand, for example.

The detection unit 20 is provided at a position corresponding to a user finger when the user grips the tactile presentation apparatus 10 (casing 1). In the present embodiment, the detection unit 20 is provided at a position corresponding to the vicinity of first joint portions of four fingers, i.e., an index finger, a middle finger, a ring finger, and a little finger.

It should be noted that the position at which the detection unit 20 is provided is not limited thereto. For example, the detection unit 20 may be provided at a position corresponding to one, two, three, four or five fingers selected from five fingers, i.e., a thumb finger, an index finger, a middle finger, a ring finger, and a little finger. Moreover, the detection unit 20 may be provided at a position corresponding to second joint portions or third joint portions (except for the thumb finger) of the fingers.

Moreover, detection units 20 may be provided separately at two or more separated positions. For example, a first detection unit 20 may be disposed at a position corresponding to an index finger, a middle finger, a ring finger, and a little finger and a second detection unit 20 may be disposed at a position corresponding to a thumb finger. Alternatively, for example, the first detection unit 20 may be disposed at a position corresponding to first joint portions of the index finger, the middle finger, the ring finger, and the little finger and the second detection unit 20 may be disposed at a position corresponding to second joint portions or third joint portions of the index finger, the middle finger, the ring finger, and the little finger.

Typically, the detection unit 20 may be provided at any position and a plurality of detection units 20 may be separately provided on a single tactile presentation apparatus 10 as long as the detection unit(s) 20 is provided at a position(s) different from that of the presentation unit 30 and can appropriately detect a gripping force from the user.

The presentation unit 30 is provided at a position of on the casing 1, which is different from that of the detection unit 20. As will be described later, the presentation unit 30 presents a tactile sensation to the user by expanding/contracting due to a fluid in accordance with a force detected by the detection unit 20 of the other tactile presentation apparatus 10.

Here, provided that the detection unit 20 and the presentation unit 30 are provided at the same position, there is a problem in that it is difficult for the user to recognize whether the user feels a force as a reaction force produced when the user grips the tactile presentation apparatus 10 by him or herself or a force as a gripping force produced when the other user grips the tactile presentation apparatus 10. Therefore, in the present embodiment, the detection unit 20 and the presentation unit 30 are provided at different positions.

In the present embodiment, the presentation unit 30 is provided at a position corresponding to a palm (palm center) when the user grips the tactile presentation apparatus 10. It should be noted that the position at which the presentation unit 30 is provided is not limited thereto. For example, the presentation unit 30 may be provided at a position corresponding to a user finger. In this case, the detection unit 20 may be provided at a position corresponding to a palm or the like other than fingers.

Moreover, presentation units 30 may be separately provided at two or more separated positions. For example, a first detection unit 20 may be disposed at a position on a palm, which is closer to an index finger and a second presentation unit 30 may be disposed at a position on the palm, which is closer to a little finger.

Typically, the presentation unit 30 may be provided at any position and a plurality of presentation units 30 may be separately provided on a single tactile presentation apparatus 10 as long as the presentation unit(s) 30 is provided at a position(s) different from that of the detection unit 20 and can appropriately present a tactile sensation from an other-user force to one user.

It should be noted that the positions of the presentation unit 30 and the detection unit 20 may be set in consideration of a hand position at which a person feels a force when two people shake hands actually. For example, when two people shake hands actually, one person feels a force of an index finger, a middle finger, a ring finger, a little finger, and the like of the other person, in a part of the palm, the part being closer to the little finger. Thus, in a case where the detection unit 20 is provided at a position corresponding to the index finger, the middle finger, the ring finger, the little finger, and the like, the presentation unit 30 may be provided in a part of the palm, the part being closer to the little finger.

Figure 3:
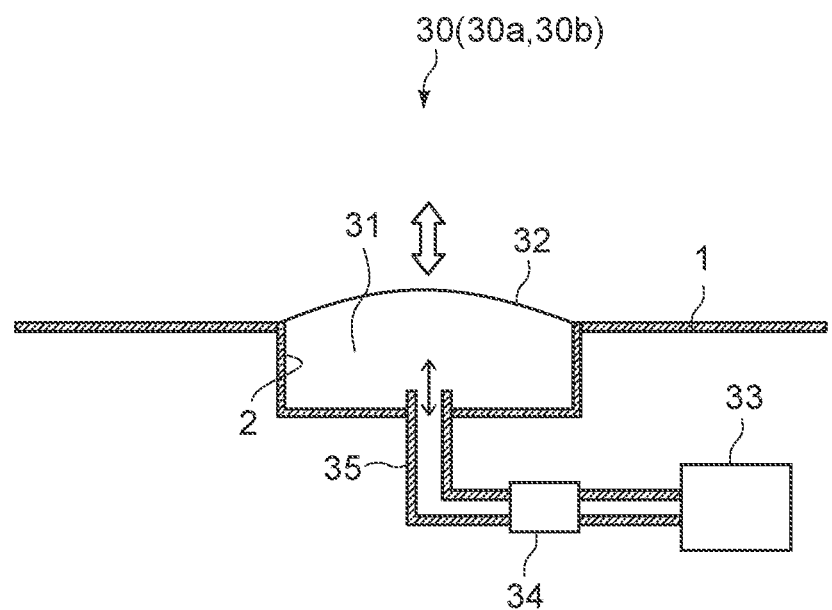
FIG. 3 A schematic view showing a configuration of a presentation unit.

FIG. 3 is a schematic view showing a configuration of the presentation unit 30.

As shown in FIG. 3, the presentation unit 30 includes a space 31 that allows the fluid to flow out and in and a deformation layer 32 provided so as to cover the space 31. Moreover, the presentation unit 30 includes a supply source 33 that supplies a fluid, an actuator 34 that controls the flow of the fluid from/into the space 31 by its driving, and a pipe 35 connecting the space 31 and the supply source 33.

The space 31 is constituted by a space sandwiched by a recess portion 2, which is configured in such a manner that a part of the casing 1 is recessed, and the deformation layer 32 covering the recess portion 2. The space 31 is provided with an outflow inlet that allows a fluid to flow out and in. There are no holes and the like in the other area. Thus, it is a sealed space.

For example, a fluid retained in the space 31 may be gas such as air and helium or may be liquid such as water and oil. It should be noted that the kind of fluid is not particularly limited, and a variety of fluids can be used.

The deformation layer 32 is configured to have a thin-film shape and is configured to be deformable by flowing of the fluid from/into the space 31. A variety of rubbers such as a silicon rubber and a natural rubber is typically used as a material used for the deformation layer 32 in consideration of the flexibility. It should be noted that the deformation layer 32 only needs to be deformable (capable of expanding and contracting) in accordance with the flow of the fluid from/into the space 31 and may be made of a material other than the rubbers.

The deformation layer 32 is capable of expanding (projecting) outward by stretching in accordance with the flow of the fluid into the space 31. Moreover, the deformation layer 32 is capable of contracting from the state in which it has expanded outward and returning to the original state by shrinking in accordance with the flow of the fluid from the space 31.

The deformation layer 32 is shrunk when a force (pressure value) from the other user is not detected by the detection unit 20 of the other tactile presentation apparatus 10. At this time, for example, the deformation layer 32 is parallel to an outer peripheral wall of the casing 1. On the other hand, when a force from the other user is detected by the detection unit 20 of the other tactile presentation apparatus 10, the deformation layer 32 expands and projects outward due to the flow of the fluid.

The actuator 34 is attached to the pipe 35 connecting the space 31 and the supply source 33. The actuator 34 controls the flow of the fluid from/into the space 31 by its driving. Although the actuator 34 is constituted by, for example, a variety of actuators 34 such as a pump, a fan, and a browser, the actuator 34 may have any configuration.

The supply source 33 is capable of supplying the space 31 with a fluid via the pipe 35. The supply source 33 may be a compressed air pressure source such as an air compressor, for example, in a case where the fluid to be used is air. Alternatively, the supply source 33 may be a tank or the like capable of storing a fluid in a case where the fluid to be used is a liquid such as water or a special gas (e.g., helium) other than the air.

It should be noted that in a case where the fluid to be used is the air, the supply source 33 may be omitted. In this case, one end side of the pipe 35 (end portion on the side opposite of the space 31) is released to the atmosphere, and the atmosphere serves as the supply source 33.

Figure 4:
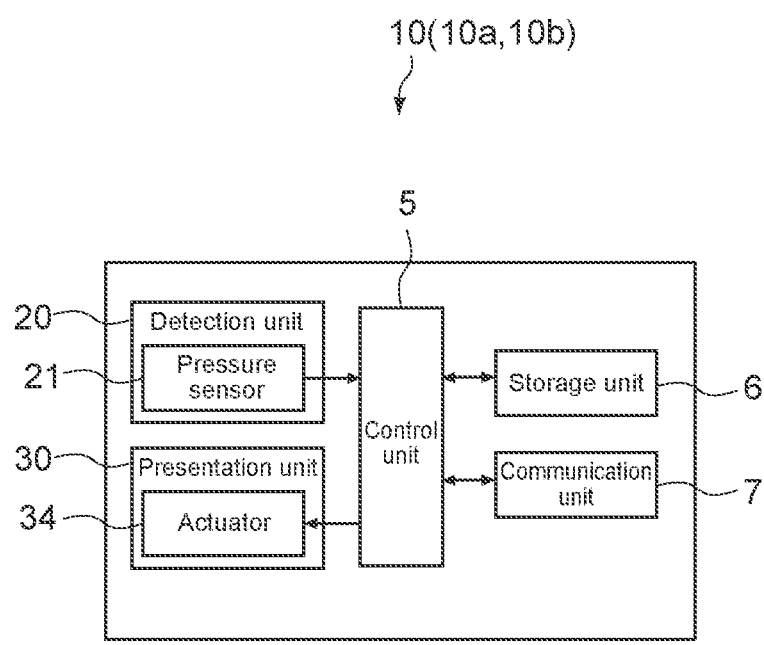
FIG. 4 A block diagram showing an internal configuration of the tactile presentation apparatus.

FIG. 4 is a block diagram showing an internal configuration of the tactile presentation apparatus 10. As shown in FIG. 4, the tactile presentation apparatus 10 includes a control unit 5, a pressure sensor 21 in the detection unit 20, the actuator 34 in the presentation unit 30, a storage unit 6, and a communication unit 7.

The control unit 5 performs a variety of arithmetic operations on the basis of various programs stored in the storage unit 6 and comprehensively controls the respective units of the tactile presentation apparatus 10.

The control unit 5 is realized by hardware or a combination of hardware and software. The hardware is configured as a part of the control unit 5 or the entire control unit 5. The hardware can be a central processing unit (CPU), a digital signal processor (DSP), a field programmable gate array (FPGA), or an application specific integrated circuit (ASIC), or a combination of two or more of them, for example.

The pressure sensor 21 is a part of the detection unit 20. The pressure sensor 21 is provided at a position corresponding to the detection unit 20 on the surface side of the casing 1. The pressure sensor 21 detects a user force (gripping force) and outputs a pressure value (detection value) depending on the detected force to the control unit 5.

The actuator 34 is a part of the presentation unit 30. The actuator 34 is driven under the control of the control unit 5 and controls the flow of the fluid from/into the space 31.

The storage unit 6 includes various programs required for the processing of the control unit 5, a nonvolatile memory for storing various types of data, and a volatile memory used as a working area for the control unit 5. It should be noted that such various programs may be read from a portable recording medium such as an optical disc and a semiconductor memory or may be downloaded from a server apparatus or the like in a network.

The communication unit 7 is configured to be capable of mutually communicating with the other tactile presentation apparatus 10 with a wire or wirelessly. It should be noted that the tactile presentation apparatus 10 may communicate with the other tactile presentation apparatus 10 directly or may communicate with the other tactile presentation apparatus 10 indirectly via another apparatus such as a server apparatus in the network.

<Operation Description>

Next, processing of the control unit 5 of the tactile presentation apparatus 10 will be described.

[Pressure Value Sending Side]

Figure 5:
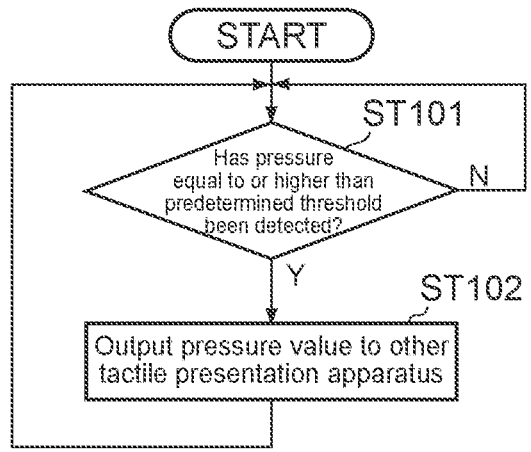
FIG. 5 A flowchart showing processing on a sending side of a pressure value.

First of all, processing on a pressure value sending side in the detection unit 20 will be described. FIG. 5 is a flowchart showing processing on the pressure value sending side.

First of all, the control unit 5 determines whether the pressure sensor 21 of the detection unit 20 has detected a pressure equal to or higher than a predetermined threshold (Step 101). The predetermined threshold is a value corresponding to a minimum force for actuating the tactile presentation apparatus 10. The predetermined threshold is preset to such a value that can prevent the tactile presentation apparatus 10 from malfunctioning due to a force other than the force (gripping force) from the user while appropriately detecting the force (gripping force) from the user.

In a case where the pressure equal to or higher than the predetermined threshold has not been detected (NO in Step 101), the control unit 5 returns to Step 101 and determines whether the pressure sensor 21 has detected the pressure equal to or higher than the predetermined threshold again.

On the other hand, in a case where the pressure equal to or higher than the predetermined threshold has been detected (YES in Step 101), the control unit 5 outputs information about the pressure value to the other tactile presentation apparatus 10 (directly or indirectly via the server apparatus or the like) (Step 102). Then, the control unit 5 returns to Step 101.

It should be noted that the control unit 5 may perform processing such as amplification and reduction on the pressure value (detection value) detected by the pressure sensor 21 and send the amplified or reduced pressure value to the other tactile presentation apparatus 10 (the pressure value obtained by processing such as amplification and reduction is also considered as the detection value of the detection unit). Moreover, the control unit 5 may send the pressure value (detection value) (may be subjected to processing such as amplification and reduction) to the other tactile presentation apparatus 10 via the other apparatus such as the server apparatus. In this case, the server apparatus in the network may perform processing such as amplification and reduction on the detected pressure value (detection value). Alternatively, the other tactile presentation apparatus 10 that is a pressure value receiving side may perform processing such as amplification and reduction on the received pressure value.

[Pressure Value Receiving Side]

Figure 6:
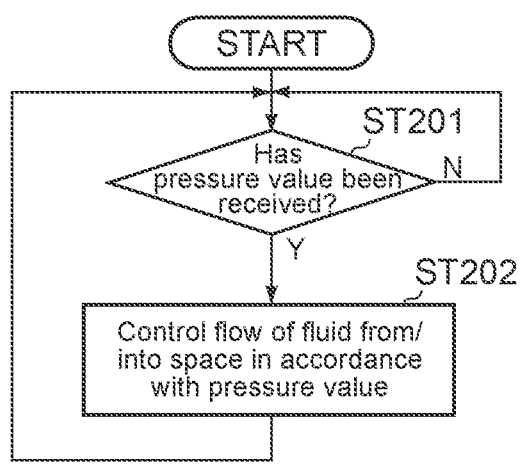
FIG. 6 A flowchart showing processing on a receiving side of the pressure value.

Next, processing on the pressure value receiving side will be described. FIG. 6 is a flowchart showing processing on the pressure value receiving side.

First of all, the control unit 5 determines whether a pressure value has been received from the other tactile presentation apparatus 10 (directly or indirectly via the server apparatus or the like) (Step 201). In a case where the pressure value has not been received (NO in Step 201), the control unit 5 returns to Step 201 and determines whether the pressure value has been received from the other tactile presentation apparatus 10 again.

On the other hand, in a case where the pressure value has been received from the other tactile presentation apparatus 10 (YES in Step 201), the control unit 5 drives the actuator 34 of the presentation unit 30 and controls the flow of the fluid from/into the space 31 in accordance with the pressure value (Step 202). Accordingly, the control unit 5 causes the deformation layer 32 to expand/contract to thereby present a tactile sensation (force) depending on the pressure value to the user. Then, the control unit 5 returns to Step 201.

In Step 202, for example, in a case where the received pressure value is higher than the previous pressure value, the control unit 5 may cause the fluid to flow in the space 31 so that the deformation layer 32 expands and projects outward. In contrast, in a case where the received pressure value is lower than the previous pressure value, the control unit 5 may cause the fluid to flow out from the space 31 so that the deformation layer 32 contracts.

It should be noted that the control unit 5 may repeat in a short period the operation of causing the deformation layer 32 to expand/contract to thereby present a vibration to the user.

Specific Example

Next, specifically what operation two tactile presentation apparatuses 10 perform will be described taking a specific example.

In the description of the specific example, in order to especially distinguish the two tactile presentation apparatuses 10, one tactile presentation apparatus 10 will be referred to as a first tactile presentation apparatus 10a and another tactile presentation apparatus 10 will be referred to as a second tactile presentation apparatus 10b (see FIG. 1). Moreover, in order to distinguish the two users, the user who operates the first tactile presentation apparatus 10a will be referred to as a first user and the user who operates the second tactile presentation apparatus 10b will be referred to as a second user.

Moreover, in the description of the specific example, in the first tactile presentation apparatus 10a and the second tactile presentation apparatus 10b, in order to distinguish the respective units (e.g., the detection unit 20, the presentation unit 30) and the like having similar configurations, the wordings "first . . . " and "second . . . " will be used.

For example, it is assumed that when they are referred to as a first detection unit 20a, a first presentation unit 30a, and the like, they refer to the detection unit 20 and the presentation unit 30 of the first tactile presentation apparatus 10a (see FIG. 1). Similarly, it is assumed that when they are referred to as a second detection unit 20b, a second presentation unit 30b, and the like, they refer to the detection unit 20 and the presentation unit 30 of the second tactile presentation apparatus 10b (see FIG. 1).

"When the First User Grips the First Tactile Presentation Apparatus 10a"

First of all, when the first user holds the first tactile presentation apparatus 10a and grips the first tactile presentation apparatus 10a, a first pressure sensor 21 of the first detection units 20a detects a first pressure value depending on the gripping force of the first user (see Step 101). A first control unit 5 sends the detected first pressure value to the second tactile presentation apparatus 10b (directly or indirectly via the server apparatus or the like) (see Step 102).

When a second control unit 5 of the second tactile presentation apparatus 10b receives the first pressure value from the first tactile presentation apparatus 10a (directly or indirectly via the server apparatus or the like) (see YES in Step 201), the second control unit 5 of the second tactile presentation apparatus 10b drives a second actuator 34 of the second presentation unit 30b in accordance with the first pressure value and controls the flow of the fluid from/into a second space 31 (see Step 202). Accordingly, the second control unit 5 causes a second deformation layer 32 to expand/contract to thereby present a tactile sensation (force) depending on the first pressure value to the second user.

Here, the second tactile presentation apparatus 10b can present to the second user such a sensation that the palm is pushed due to the expansion of the second deformation layer 32, and can also present to the second user such a sensation that the pushed palm returns to the original form due to the contraction of the second deformation layer 32.

"When the Second User Grips the Second Tactile Presentation Apparatus 10b"

When the second user holds the second tactile presentation apparatus 10b and grips the second tactile presentation apparatus 10b, a second pressure sensor 21 of the second detection unit 20b detects a second pressure value depending on the gripping force of the second user (see Step 101). The second control unit 5 sends the detected second pressure value to the first tactile presentation apparatus 10a (directly or indirectly via the server apparatus or the like) (see Step 102).

When the first control unit 5 of the first tactile presentation apparatus 10a receives a second pressure value from the second tactile presentation apparatus 10b (directly or indirectly via the server apparatus or the like) (see YES in Step 201), the first control unit 5 of the first tactile presentation apparatus 10a drives a first actuator 34 of the first presentation unit 30a in accordance with the second pressure value and controls the flow of the fluid from/into a first space 31 (see Step 202). Accordingly, the first control unit 5 causes a first deformation layer 32 to expand/contract to thereby present the first user to a tactile sensation (force) depending on the second pressure value.

Here, the first tactile presentation apparatus 10a can present to the first user such a sensation that the palm is pushed due to the expansion of the first deformation layer 32 and can also present to the first user such a sensation that the pushed palm returns to the original form due to the contraction of the first deformation layer 32.

<Actions, Etc.>

As described above, in the tactile presentation apparatuses 10 according to the present embodiment, the detection unit 20 that detects its user force and the presentation unit 30 that presents a tactile sensation depending on a force of the other user are provided at different positions.

Here, provided that the detection unit 20 and the presentation unit 30 are provided at the same position, there is a problem in that it is difficult for the user to recognize whether the user feels a force as a reaction force produced when the user grips the tactile presentation apparatus 10 by him or herself or a force as a gripping force produced when the other user grips the tactile presentation apparatus 10. However, since in the present embodiment, the detection unit 20 and the presentation unit 30 are provided at different positions, the user can appropriately recognize a tactile sensation based on a force from the other user.

Moreover, in the present embodiment, the presentation unit 30 is capable of expanding and contracting due to a fluid. Accordingly, a tactile sensation (force) is presented to the user. In particular, in the present embodiment, the presentation unit 30 is constituted by the space 31 and the deformation layer 32 that covers the space 31, and the deformation layer 32 expands and contracts due to the fluid flowing from and into the space 31 to thereby present a tactile sensation to the user. Accordingly, a tactile sensation (force) as if the user gripped the hand actually can be presented to the user, and fine, multi-stage control can also be performed on the presented tactile sensation (force).

Second Embodiment

Next, a second embodiment of the present technology will be described. In the second embodiment, safety control for reducing excessive expansion of the presentation unit 30 (deformation layer 32) and feedback control for correctly controlling expansion and contraction of the presentation unit 30 (deformation layer 32) are performed.

Figure 7:
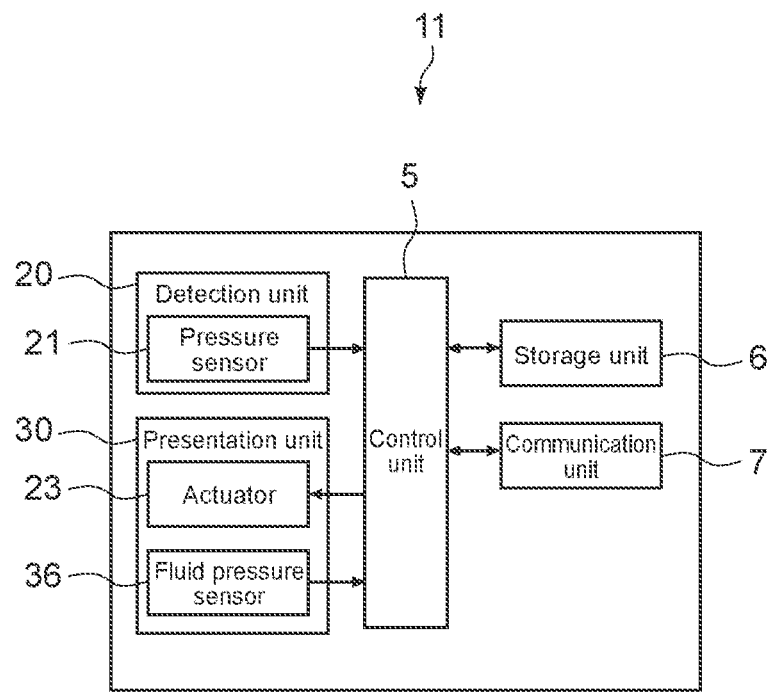
FIG. 7 A block diagram showing an internal configuration of a tactile presentation apparatus according to a second embodiment.

FIG. 7 is a block diagram showing an internal configuration of a tactile presentation apparatus 11 according to the second embodiment.

As shown in FIG. 7, in the tactile presentation apparatus 11 according to the second embodiment, the presentation unit 30 further includes a fluid pressure sensor 36. The fluid pressure sensor 36 is configured to be capable of detecting a pressure of the fluid in the space 31 of the presentation unit 30 and configured to be capable of outputting the detected pressure value to the control unit 5.

Figure 8:
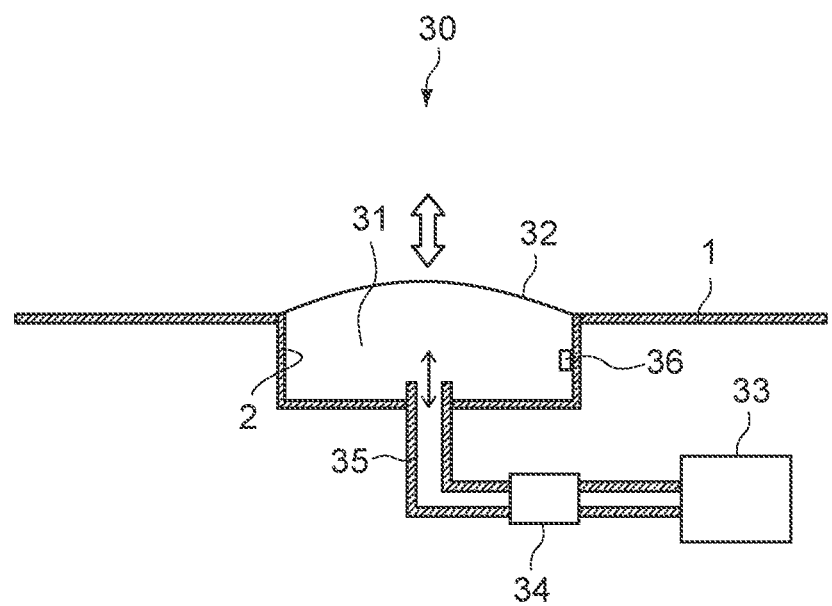
FIG. 8 A diagram showing an example at a position at which a fluid pressure sensor is disposed.

FIG. 8 is a diagram showing an example at a position at which the fluid pressure sensor 36 is disposed. In the example shown in FIG. 8, the fluid pressure sensor 36 is provided in a side wall portion of the recess portion 2 of the casing 1, the side wall portion forming the space 31.

It should be noted that the position at which the fluid pressure sensor 36 is disposed is not limited thereto. For example, the fluid pressure sensor 36 may be provided at a bottom portion of the recess portion 2 of the casing 1. Typically, the fluid pressure sensor 36 may be provided at any position as long as it can detect a pressure of the fluid in the space 31.

<Operation Description>

Figure 9:
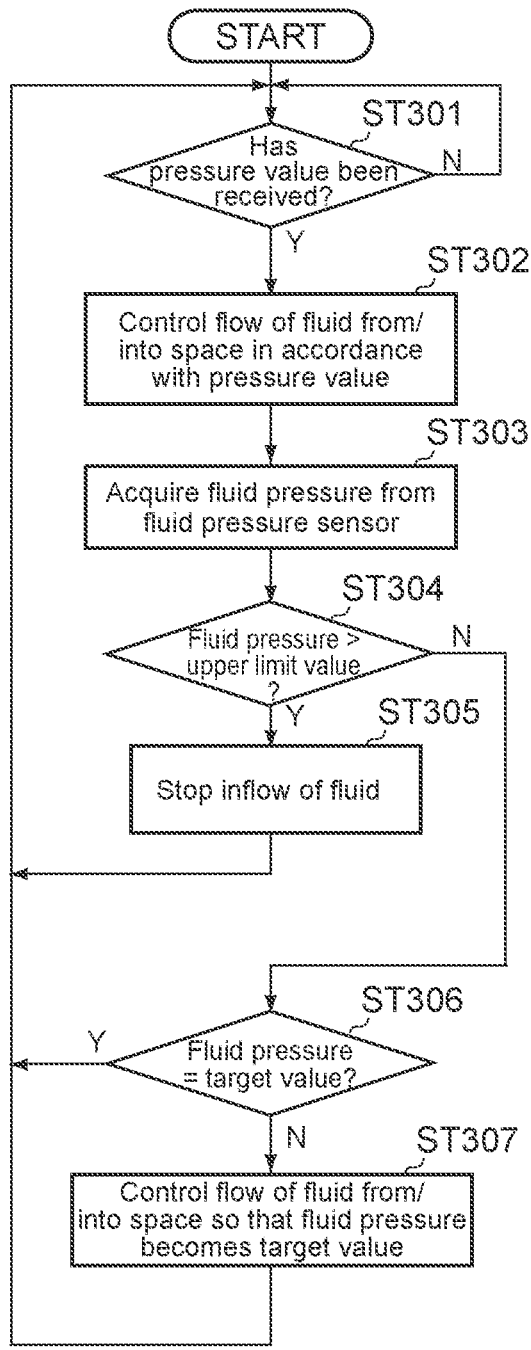
FIG. 9 A flowchart showing processing of the tactile presentation apparatus according to the second embodiment.

FIG. 9 is a flowchart showing processing of the tactile presentation apparatus 11 according to the second embodiment. As shown in FIG. 9, when the control unit 5 of the tactile presentation apparatus 11 has received a pressure value detected by a detection unit 20 of another tactile presentation apparatus 11 (YES in Step 301), the control unit 5 of the tactile presentation apparatus 11 drives the actuator 34 of the presentation unit 30 and controls the flow of the fluid from/into the space 31 in accordance with the pressure value (Step 302).

Next, the control unit 5 acquires a pressure value of the fluid in the space 31 from the fluid pressure sensor 36 (Step 303). Next, the control unit 5 determines whether the pressure value of the fluid exceeds an upper limit value (Step 304). The upper limit value is a threshold set for safety control to suppress excessive expansion of the deformation layer 32.

In a case where the pressure value of the fluid exceeds the upper limit value (YES in Step 304), the control unit 5 stops the flow of the fluid into the space 31 (Step 305). Alternatively, in this case, the control unit 5 may cause the fluid to flow out from the space 31 and slightly reduce the pressure of the fluid. Then, the control unit 5 returns to Step 301.

In Step 304, in a case where the pressure value of the fluid in the space 31 is equal to or lower than the upper limit value (NO in Step 304), the control unit 5 shifts to Step 306. In Step 306, the control unit 5 determines whether the pressure value of the fluid is a desired value (or an approximation value of the desired value).

The desired value is a value that is set for feedback control for correctly controlling the pressure value of the fluid in the space 31 and correctly controlling the expansion and contraction of the deformation layer 32. The desired value is a value that is set to the pressure value of the fluid on the basis of the pressure value received from the other tactile presentation apparatus 11, and this desired value increases in proportion to the received pressure value (but does not exceed the upper limit value of the pressure).

In a case where the pressure value of the fluid in the space 31 is the desired value (or the approximation value) (YES in Step 306), the control unit 5 returns to Step 301.

On the other hand, in a case where the pressure value of the fluid in the space 31 is not the desired value (or the approximation value) (NO in Step 306), the control unit 5 drives the actuator 34 and controls the flow of the fluid from/into the space 31 so that the pressure value of the fluid becomes the desired value (or the approximation value) (Step 307).

At this time, in a case where the pressure value of the fluid in the space 31 is above the desired value, the control unit 5 drives the actuator 34, causes the fluid to flow out from the space 31, and reduces the pressure value in the space 31. On the other hand, in a case where the pressure value of the fluid in the space 31 is below the desired value, the control unit 5 drives the actuator 34, causes the fluid to flow in the space 31, and increases the pressure value in the space 31. Then, the control unit 5 returns to Step 301.

<Actions, Etc.>

In the second embodiment, the safety control (see Steps 303 to 305) can suppress excessive expansion of the deformation layer 32. Moreover, in the second embodiment, feedback control (Steps 303, 306 to 307) controls the pressure value of the fluid in the space 31 to be an accurate value. The expansion and contraction of the deformation layer 32 can be thus correctly controlled, and an appropriate tactile sensation (force) depending on the force detected by the other tactile presentation apparatus 11 can be presented to the user.

Although the case where both the safety control and feedback control are performed in accordance with the pressure value of the fluid in the space 31 has been described in the description of the second embodiment, either the safety control or feedback control unit 5 may be performed.

Third Embodiment

Next, a third embodiment of the present technology will be described. In the third embodiment, as in the second embodiment, safety control for reducing excessive expansion of the presentation unit 30 (deformation layer 32) and feedback control for correctly controlling the expansion and contraction of the presentation unit 30 (deformation layer 32) are performed. However, the sensor to be used for such control is different from that of the second embodiment.

Figure 10:
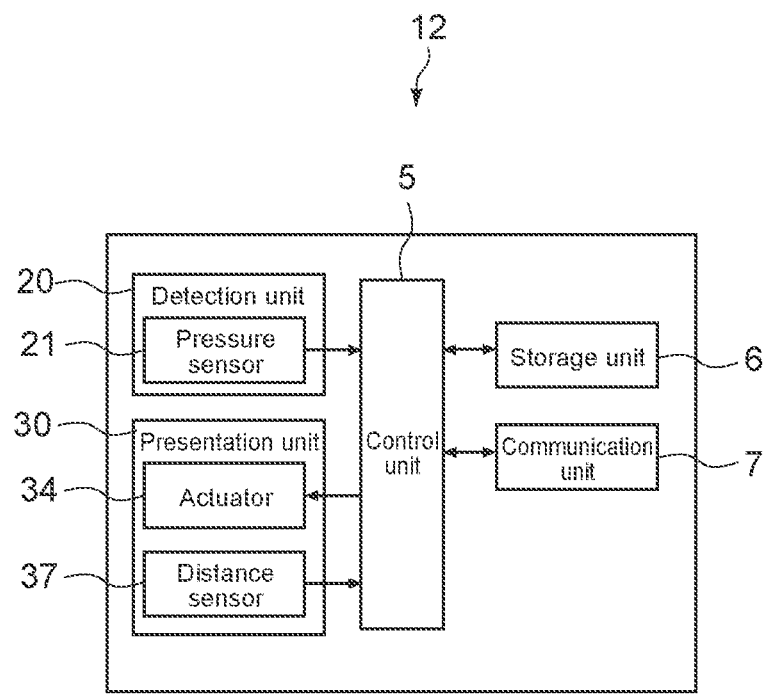
FIG. 10 A block diagram showing an internal configuration of a tactile presentation apparatus according to a third embodiment.

FIG. 10 is a block diagram showing an internal configuration of a tactile presentation apparatus 12 according to the third embodiment.

As shown in FIG. 10, in the tactile presentation apparatus 12 according to the third embodiment, the presentation unit 30 includes a distance sensor 37 instead of the fluid pressure sensor 36 of the second embodiment. The distance sensor 37 is configured to be capable of measuring a distance to the deformation layer 32. The distance sensor 37 is capable of detecting to what degree the deformation layer 32 has expanded by measuring a distance to the deformation layer 32.

Figure 11:
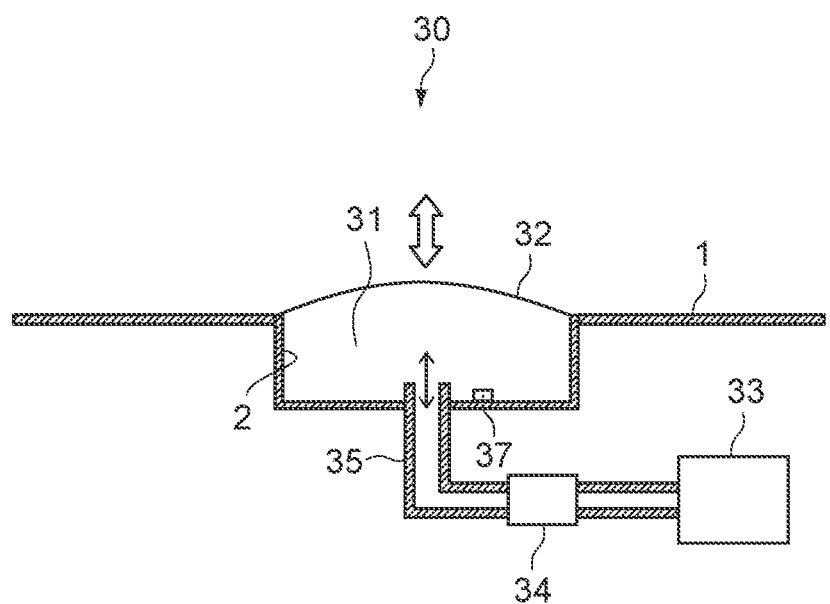
FIG. 11 A diagram showing an example at a position at which a distance sensor is disposed.

FIG. 11 is a diagram showing an example at a position at which the distance sensor 37 is disposed. In the example shown in FIG. 11, the distance sensor 37 is provided in a bottom portion of the recess portion 2 of the casing 1, the bottom portion forming the space 31.

It should be noted that the position at which the distance sensor 37 is disposed is not limited thereto. For example, the distance sensor 37 may be provided in the side wall portion of the recess portion 2 of the casing 1. Typically, the distance sensor 37 may be provided at any position as long as it can detect a distance to the deformation layer 32 according to expansion or contraction.

<Operation Description>

Figure 12:
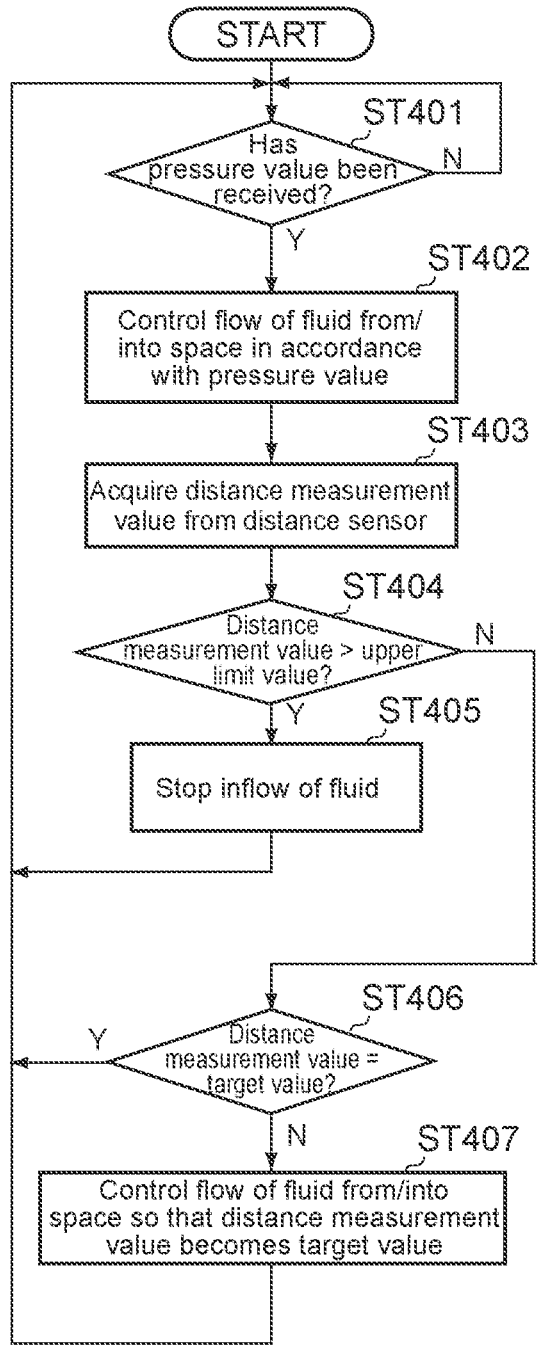
FIG. 12 A flowchart showing processing of the tactile presentation apparatus according to the third embodiment.

FIG. 12 is a flowchart showing processing of the tactile presentation apparatus 12 according to the third embodiment. As shown in FIG. 12, when the control unit 5 of the tactile presentation apparatus 12 receives a pressure value detected by the detection unit 20 of the other tactile presentation apparatus 12 (YES in Step 401), the control unit 5 of the tactile presentation apparatus 12 drives the actuator 34 of the presentation unit 30 and controls the flow of the fluid from/into the space 31 in accordance with the pressure value (Step 402).

Next, the control unit 5 acquires from the distance sensor 37 a distance measurement value that is information about a distance between the distance sensor 37 and the deformation layer 32 (Step 403). Next, the control unit 5 determines whether the distance measurement value exceeds an upper limit value (Step 404). The upper limit value is a threshold set regarding the distance for safety control to suppress excessive expansion of the deformation layer 32.

In a case where the distance measurement value between the distance sensor 37 and the deformation layer 32 exceeds the upper limit value (YES in Step 404), the control unit 5 stops the flow of the fluid into the space 31 (Step 405). Alternatively, in this case, the control unit 5 may cause the fluid to flow out from the space 31 and slightly reduce the pressure of the fluid. Then, the control unit 5 returns to Step 401.

In Step 404, in a case where the distance measurement value between the distance sensor 37 and the deformation layer 32 is equal to or lower than the upper limit value (NO in Step 404), the control unit 5 shifts to Step 406. In Step 406, the control unit 5 determines whether the distance measurement value between the distance sensor 37 and the deformation layer 32 is a desired value (or an approximation value of the desired value).

The desired value is a value that is set for feedback control for correctly controlling the distance between the distance sensor 37 and the deformation layer 32 and correctly controlling the expansion and contraction of the deformation layer 32. The desired value is a value set regarding the distance on the basis of the pressure value received from the other tactile presentation apparatus 12. This desired value increases in proportion to the received pressure value (but does not exceed the upper limit value of the distance).

In a case where the distance measurement value between the distance sensor 37 and the deformation layer 32 is the desired value (or the approximation value) (YES in Step 406), the control unit 5 returns to Step 401.

On the other hand, in a case where the distance measurement value between the distance sensor 37 and the deformation layer 32 is not the desired value (or the approximation value) (NO in Step 406), the control unit 5 drives the actuator 34 and controls the flow of the fluid from/into the space 31 so that the distance measurement value between the distance sensor 37 and the deformation layer 32 becomes the desired value (or the approximation value) (Step 407).

At this time, in a case where the distance measurement value between the distance sensor 37 and the deformation layer 32 is above the desired value, the control unit 5 causes the fluid to flow out from the space 31, reduces the pressure value in the space 31, and reduces the distance. On the other hand, in a case where the distance measurement value between the distance sensor 37 and the deformation layer 32 is below the desired value, the control unit 5 causes the fluid to flow in the space 31, increases the pressure value in the space 31, and increases the distance. Then, the control unit 5 returns to Step 401.

<Actions, Etc.>

In the third embodiment, as in the second embodiment, the safety control (see Steps 403 to 405) can suppress excessive expansion of the deformation layer 32. Moreover, in the third embodiment, feedback control (Steps 403, 406 to 407) correctly controls the distance between the distance sensor 37 and the deformation layer 32. The expansion and contraction of the deformation layer 32 can be thus correctly controlled, and an appropriate tactile sensation (force) depending on the force detected by the other tactile presentation apparatus 12 can be presented to the user.

Although the case where both the safety control and feedback control are performed has been described in accordance with the distance measurement value between the distance sensor 37 and the deformation layer 32 in the description of the third embodiment, either the safety control or feedback control unit 5 may be performed.

The second embodiment and the third embodiment may be combined. In this case, both the fluid pressure sensor 36 and the distance sensor 37 are provided in the tactile presentation apparatuses 10.

Fourth Embodiment

Next, a fourth embodiment of the present technology will be described. In the fourth embodiment, a temperature of a presentation unit 30 of another tactile presentation apparatus 13 is controlled on the basis of a temperature of a detection unit 20 of one tactile presentation apparatus 13.

Figure 13:
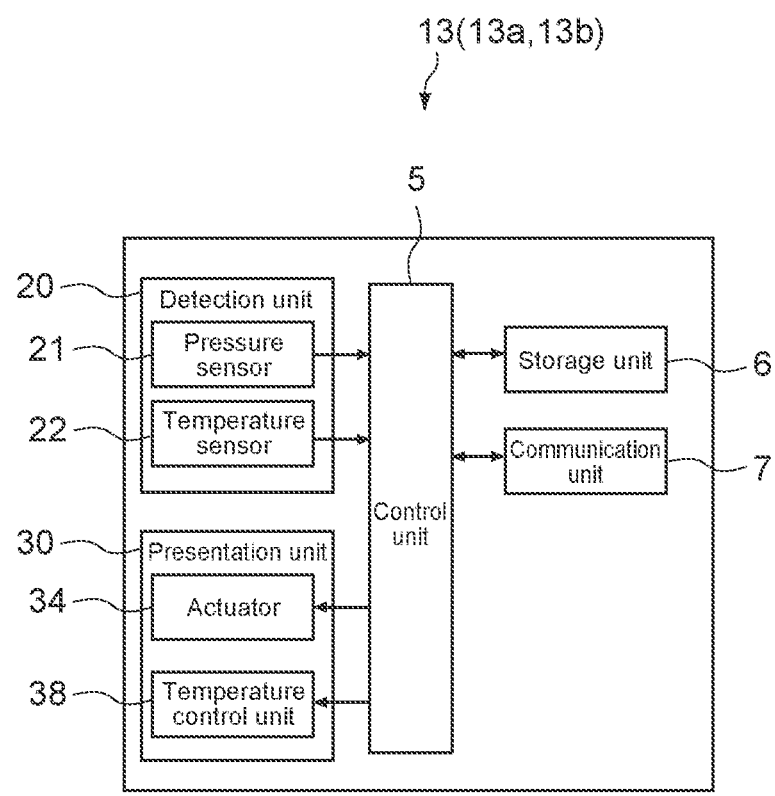
FIG. 13 A block diagram showing an internal configuration of a tactile presentation apparatus according to a fourth embodiment.

FIG. 13 is a block diagram showing an internal configuration of a tactile presentation apparatus 13 according to the fourth embodiment.

As shown in FIG. 13, in the tactile presentation apparatus 13 according to the fourth embodiment, the detection unit 20 further includes a temperature sensor 22. Moreover, in the tactile presentation apparatus 13 according to the fourth embodiment, the presentation unit 30 further includes a temperature control unit 38.

The temperature sensor 22 is provided at a position corresponding to the detection unit 20, and is configured to be capable of detecting a temperature of a user body (e.g., a hand, fingers).

The temperature control unit 38 is provided at a position corresponding to the presentation unit 30 and is configured to be capable of controlling the temperature of the presentation unit 30 (in particular, the deformation layer 32) in accordance with the control of the control unit 5. The temperature control unit 38 is a heating and cooling apparatus (that may perform either heating or cooling), and constituted by a Peltier device, a heater, and the like, for example.

Figure 14:
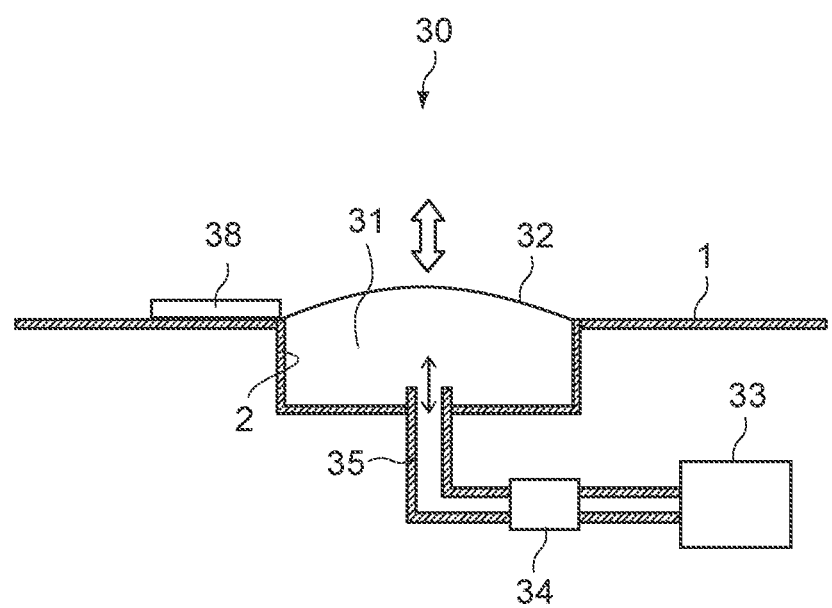
FIG. 14 A diagram showing an example at a position at which a temperature control unit is disposed.
Figure 15:
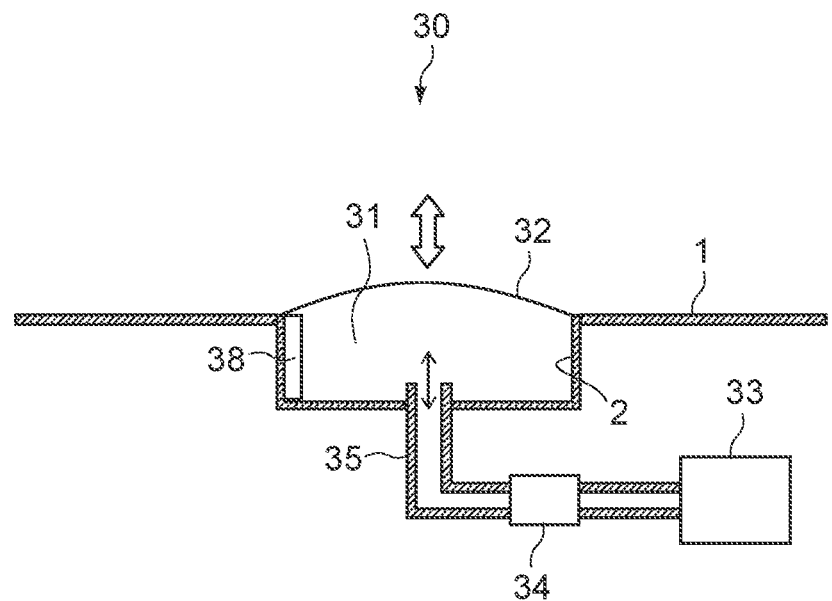
FIG. 15 A diagram showing an example at a position at which a temperature control unit is disposed.

FIGS. 14 and 15 are diagrams showing an example at a position at which the temperature control unit 38 is disposed.

In the example shown in FIG. 14, the temperature control unit 38 is provided at a position proximate to (or in contact with) the presentation unit 30 on the surface side of the casing 1. In particular, in the example shown in FIG. 14, the temperature control unit 38 is provided at the position proximate to the deformation layer 32.

On the other hand, in the example shown in FIG. 15, the temperature control unit 38 is disposed in the space 31 of the presentation unit 30. In particular, in the example shown in FIG. 15, the temperature control unit 38 is disposed at the position proximate to the deformation layer 32 on the side wall portion of the recess portion 2 of the casing 1.

As shown in FIGS. 14 and 15, since the temperature control unit 38 is provided at the position proximate to the deformation layer 32, the temperature control unit 38 can efficiently transfer heat to the deformation layer 32 and a thermal sensation can be efficiently presented to the user.

It should be noted that the position at which the temperature control unit 38 is provided is not limited to the example shown in FIGS. 14 and 15. Although the temperature control unit 38 is provided on the surface side of the casing 1 as an example in FIG. 14, the temperature control unit 38 may be provided on the back side of the casing 1. Moreover, although the temperature control unit 38 is provided on the side wall portion of the recess portion 2 of the casing 1 in FIG. 15, the temperature control unit 38 may be provided on the bottom portion of the recess portion 2 of the casing 1.

In the fourth embodiment, the thermal conductivity of the deformation layer 32 may be 0.2 W/mK or more (or 0.25 W/mK, 0.3 W/mK, 0.35 W/mK, 0.4 W/mK, 0.45 W/mK, 0.5 W/mK or more). By increasing the thermal conductivity of the deformation layer 32 as such, heat of the temperature control unit 38 can be more efficiently transferred to the deformation layer 32, and a thermal sensation can be efficiently presented to the user.

In order to increase the thermal conductivity of the deformation layer 32, the deformation layer 32 (typically, a rubber) may contain carbon thin pieces, a carbon nano-tube, and the like. Alternatively, the deformation layer 32 itself may be made of a material with high thermal conductivity, such as a metal. In this case, for example, the deformation layer 32 may project outward when the deformation layer 32 that is the metal film is pulled out of a housing portion (not shown), and the deformation layer 32 may return to the original position and contract when the deformation layer 32 that is the metal film is housed in the housing portion.

<Operation Description>

Next, processing of the control unit 5 of the tactile presentation apparatus 13 according to the fourth embodiment will be described.

[Pressure Value and Temperature Value Sending Side]

Figure 16:
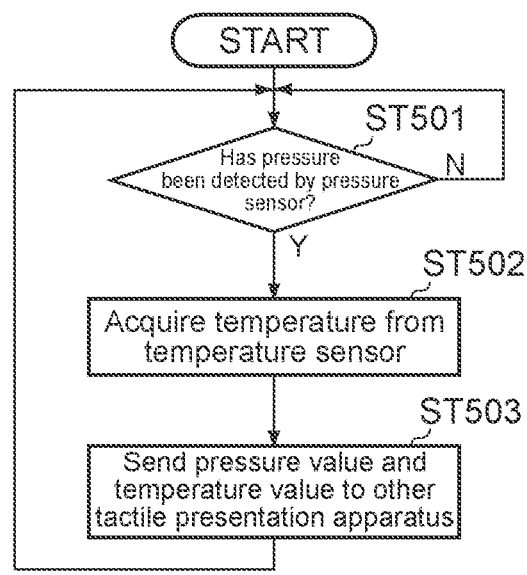
FIG. 16 A flowchart showing processing on a pressure value and temperature value sending side.

First of all, processing on a pressure value and temperature value sending side will be described. FIG. 16 is a flowchart showing processing on the pressure value and temperature value sending side.

First of all, the control unit 5 determines whether the pressure equal to or higher than the predetermined threshold has been detected by the pressure sensor 21 of the detection unit 20 (Step 501).

In a case where the pressure equal to or higher than the predetermined threshold has been detected (YES in Step 501), the control unit 5 acquires a temperature of the detection unit 20 from the temperature sensor 22 (Step 502). Next, the control unit 5 outputs information about pressure value and information about a temperature value to the other tactile presentation apparatus 13 (directly or indirectly via the server apparatus or the like) (Step 503). Then, the control unit 5 returns to Step 501.

[Pressure Value Receiving Side]

Figure 17:
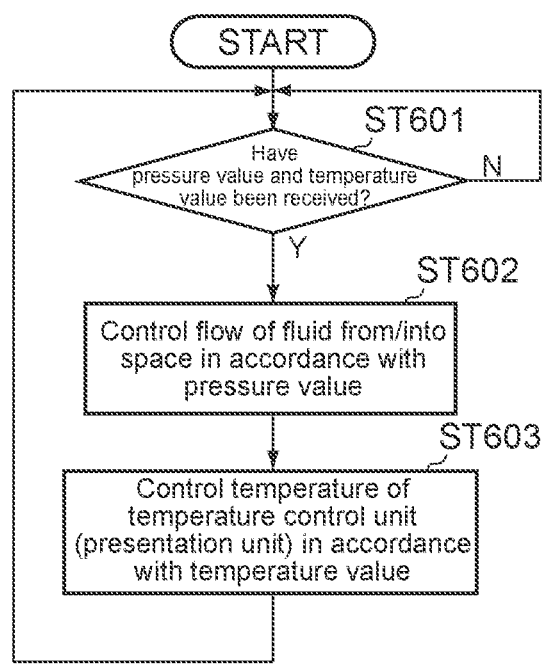
FIG. 17 A flowchart showing processing on a pressure value and temperature value receiving side.

Next, processing on a pressure value and temperature value receiving side will be described. FIG. 17 is a flowchart showing processing on the pressure value and temperature value receiving side.

First of all, the control unit 5 determines whether the pressure value and the temperature value of the detection unit 20 have been received from the other tactile presentation apparatus 13 (directly or indirectly via the server apparatus or the like) (Step 601).

In a case where the pressure value and the temperature value have been received from the other tactile presentation apparatus 13 (YES in Step 601), the control unit 5 drives the actuator 34 of the presentation unit 30 and controls the flow of the fluid from/into the space 31 in accordance with the pressure value (Step 602). Accordingly, the control unit 5 causes the deformation layer 32 to expand/contract to thereby present to the user the tactile sensation (force) depending on the pressure value detected by the detection unit 20 on the side of the other tactile presentation apparatus 13.

Next, the control unit 5 controls the temperature of the temperature control unit 38 in accordance with the received temperature value to thereby control the temperature of the presentation unit 30 (in particular, the deformation layer 32) (Step 603). Then, the control unit 5 returns to Step 601.

In this manner, the control unit 5 controls the temperature of the presentation unit 30 (in particular, the deformation layer 32) to thereby present to the user a temperature (stimulus) depending on the temperature value detected by the detection unit 20 on the side of the other tactile presentation apparatus 13. The controlled temperature of the presentation unit 30 (deformation layer 32) may be the same temperature as the temperature value detected by the other tactile presentation apparatus 10 or may be slightly different from the temperature value detected by the other tactile presentation apparatus 10.

Specific Example

Next, specifically what like operation two tactile presentation apparatuses 13 perform will be described taking a specific example.

In this description, in order to distinguish the two tactile presentation apparatuses 13, one tactile presentation apparatus 13 will be referred to as a first tactile presentation apparatus 13a and the other tactile presentation apparatus 13 will be referred to as a second tactile presentation apparatus 13b. Moreover, in this description, it is assumed that when the respective units of the tactile presentation apparatus 13 are referred to as "first . . . " and "second . . . ", respectively, they refer to the respective units related to the first tactile presentation apparatus 13a and the second tactile presentation apparatus 13b.

"When the First User Grips the First Tactile Presentation Apparatus 13a"

First of all, when the first user holds the first tactile presentation apparatus 13a and grips the first tactile presentation apparatus 13a, the first pressure sensor 21 of the first detection units 20a detects a first pressure value depending on the gripping force of the first user (see Step 501).

At this time, the first temperature sensor 22 of the first detection units 20a detects a first temperature value of a hand of the first user (a portion in contact with the first detection unit 20a). The first control unit 5 acquires a first temperature value from the first temperature sensor 22 (see Step 502). Then, the first control unit 5 sends the detected first pressure value and first temperature value to the second tactile presentation apparatus 13b (directly or indirectly via the server apparatus or the like) (see Step 503).

When the second control unit 5 of the second tactile presentation apparatus 13b receives the first pressure value and the first temperature value from the first tactile presentation apparatus 13a (directly or indirectly via the server apparatus or the like) (see YES in Step 601), the second control unit 5 of the second tactile presentation apparatus 13b drives the second actuator 34 of the second presentation unit 30b and controls the flow of the fluid from/into the second space 31 in accordance with the first pressure value (see Step 602). Accordingly, the second control unit 5 causes the second deformation layer 32 to expand/contract to thereby present a tactile sensation (force) depending on the first pressure value to the second user.

Next, the second control unit 5 controls a temperature of a second temperature control unit 38 in accordance with the first temperature value from the first tactile presentation apparatus 13a and controls the temperature of the second presentation unit 30b (in particular, the second deformation layer 32) (see Step 603). Accordingly, the second control unit 5 presents a temperature depending on the first temperature value to the second user.

"When the Second User Grips the Second Tactile Presentation Apparatus 13b"

When the second user holds the second tactile presentation apparatus 13b and grips the second tactile presentation apparatus 13b, the second pressure sensor 21 of the second detection unit 20b detects a second pressure value depending on the gripping force of the second user (see Step 501).

At this time, the second temperature sensor 22 of the second detection unit 20b detects a second temperature value of a hand of the second user (a portion in contact with the second detection unit 20b). The second control unit 5 acquires a second temperature value from the second temperature sensor 22 (see Step 502). Then, the second control unit 5 sends the detected second pressure value and second temperature value to the first tactile presentation apparatus 13a (directly or indirectly via the server apparatus or the like) (see Step 503).

When the first control unit 5 of the first tactile presentation apparatus 13a receives the second pressure value and the second temperature value from the second tactile presentation apparatus 13b (directly or indirectly via the server apparatus or the like) (see YES in Step 601), the first control unit 5 of the first tactile presentation apparatus 13a drives the first actuator 34 of the first presentation unit 30a and controls the flow of the fluid from/into the first space 31 in accordance with the second pressure value (see Step 602). Accordingly, the first control unit 5 causes the first deformation layer 32 to expand/contract to thereby present a tactile sensation (force) depending on the second pressure value to the first user.

Next, the first control unit 5 controls a temperature of a first temperature control unit 38 in accordance with the second temperature value from the second tactile presentation apparatus 13b to thereby control the temperature of the first presentation unit 30a (in particular, the first deformation layer 32) (see Step 603). Accordingly, the first control unit 5 presents a temperature depending on the second temperature value to the first user.

<Actions, Etc.>

In the fourth embodiment, not only a tactile sensation based on the force of the other user, but also a temperature sensation based on the temperature of the other user can be presented to the user.

In the description of the fourth embodiment, the case where the temperature value of the temperature sensor 22 of the detection unit 20 is sent to the other tactile presentation apparatus 13 only when the pressure sensor 21 of the detection unit 20 in the one tactile presentation apparatus 13 has detected the pressure value has been described. However, the temperature value of the temperature sensor 22 of the detection unit 20 may be sent to the other tactile presentation apparatus 13 irrespective of whether the pressure sensor 21 of the detection unit 20 in the one tactile presentation apparatus 13 has detected the pressure value.

In this case, when the information about the temperature value has been received, the other tactile presentation apparatus 13 only needs to control the temperature of the presentation unit 30 by the use of the temperature control unit 38 on the basis of the information about the temperature value. That is, the tactile sensation (force) presentation and the temperature presentation may be each performed independently and separately.

It should be noted that the fourth embodiment can be combined with the second embodiment (the safety control and feedback control by the pressure sensor 36) and the third embodiment (the safety control and feedback control by the distance sensor 37).

Fifth Embodiment

Next, a fifth embodiment of the present technology will be described. In the fifth embodiment, safety control to suppress excessive heating of the presentation unit 30 and feedback control in the temperature control of the presentation unit 30 by the temperature control unit 38 are performed.

Figure 18:
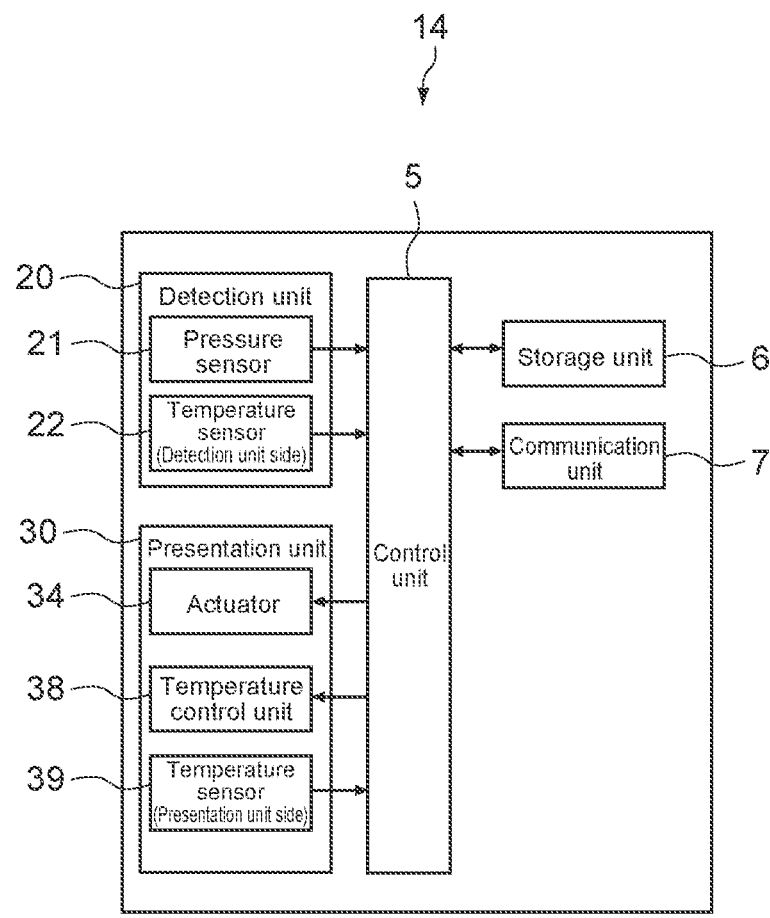
FIG. 18 A block diagram showing an internal configuration of a tactile presentation apparatus according to a fifth embodiment.

FIG. 18 is a block diagram showing an internal configuration of a tactile presentation apparatus 14 according to the fifth embodiment.

As shown in FIG. 18, in the tactile presentation apparatus 14 according to the fifth embodiment, the presentation unit 30 further includes a temperature sensor 39. The temperature sensor 39 is configured to be capable of detecting a temperature of the presentation unit 30 (in particular, the deformation layer 32) and configured to be capable of outputting the detected temperature value to the control unit 5.

It should be noted that in the description of the fifth embodiment, in order to distinguish the temperature sensor 22 provided on the side of the detection unit 20 and the temperature sensor 39 provided on the side of the presentation unit 30, the temperature sensor 22 provided on the side of the detection unit 20 will be referred to as a detection unit side temperature sensor 22 and the temperature sensor 22 provided on the side of the presentation unit 30 will be referred to as a presentation unit side temperature sensor 39.

Figure 19:
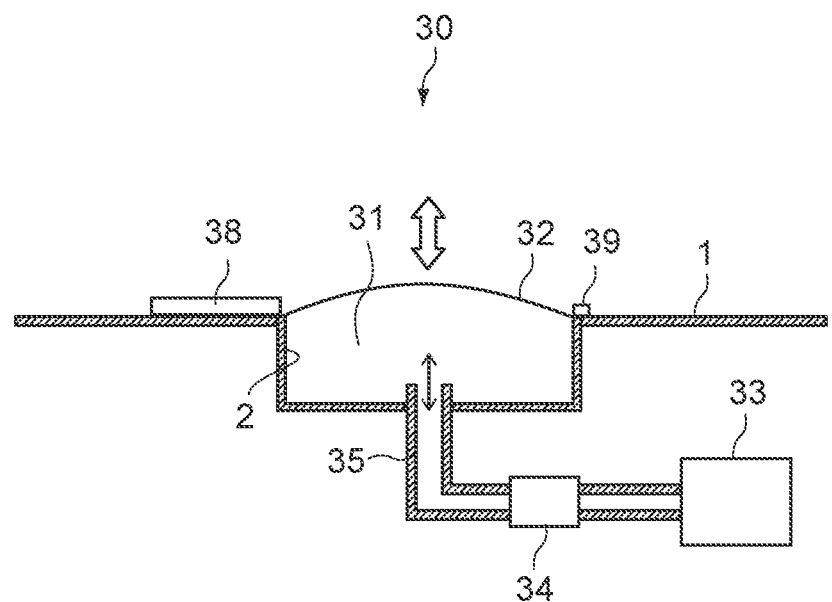
FIG. 19 A diagram showing an example at a position at which a presentation unit side temperature sensor is disposed.
Figure 20:
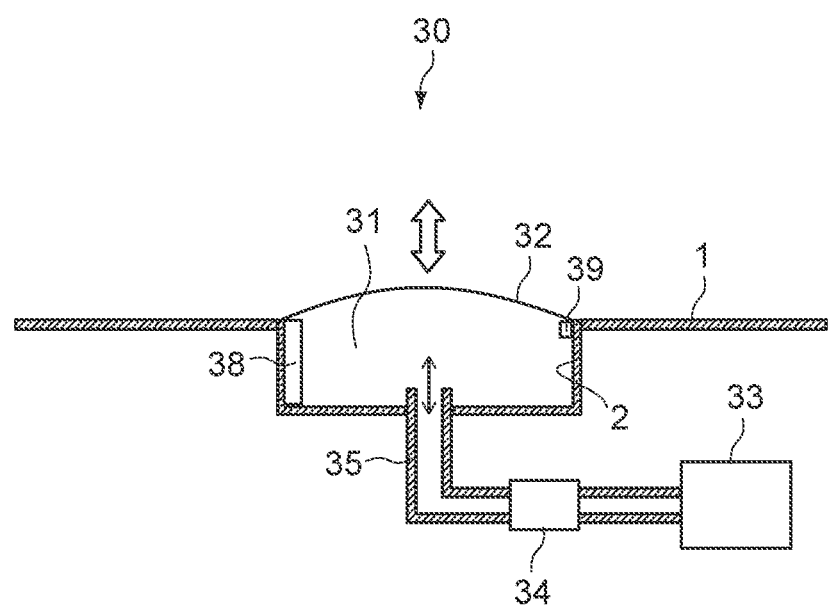
FIG. 20 A diagram showing an example at a position at which a presentation unit side temperature sensor is disposed.

FIGS. 19 and 20 are diagrams showing an example at a position at which the presentation unit side temperature sensor 39 is disposed.

In the example shown in FIG. 19, the presentation unit side temperature sensor 39 is provided at a position proximate to (or in contact with) the presentation unit 30 on the surface side of the casing 1. In particular, in the example shown in FIG. 19, the presentation unit side temperature sensor 39 is provided at the position proximate to the deformation layer 32.

On the other hand, in the example shown in FIG. 20, the presentation unit side temperature sensor 39 is disposed in the space 31 of the presentation unit 30. In particular, in the example shown in FIG. 20, the presentation unit side temperature sensor 39 is disposed at the position proximate to the deformation layer 32 on the side wall portion of the recess portion 2 of the casing 1.

Since the presentation unit side temperature sensor 39 is provided at the position proximate to the deformation layer 32 as shown in FIGS. 19 and 20, heat in the deformation layer 32 (the presentation unit 30) can be correctly detected.

It should be noted that the position at which the presentation unit side temperature sensor 39 is provided is not limited to the example shown in FIGS. 19 and 20. Although the presentation unit side temperature sensor 39 is provided on the surface side of the casing 1 as an example in FIG. 19, the presentation unit side temperature sensor 39 may be provided on the back side of the casing 1. Moreover, although the presentation unit side temperature sensor 39 is provided on the side opposite of the temperature control unit 38 across the presentation unit 30 in the example shown in FIG. 19, the presentation unit side temperature sensor 39 may be provided on the same side as the temperature control unit 38.

Moreover, although the presentation unit side temperature sensor 39 is provided on the side opposite of the temperature control unit 38 in the space 31 in FIG. 20, the presentation unit side temperature sensor 39 may be provided on the same side as the temperature control unit 38. Moreover, although the presentation unit side temperature sensor 39 is provided on the side wall portion of the recess portion 2 of the casing 1 in FIG. 20, the presentation unit side temperature sensor 39 may be provided on the bottom portion of the recess portion 2 of the casing 1.

<Operation Description>

Figure 21:
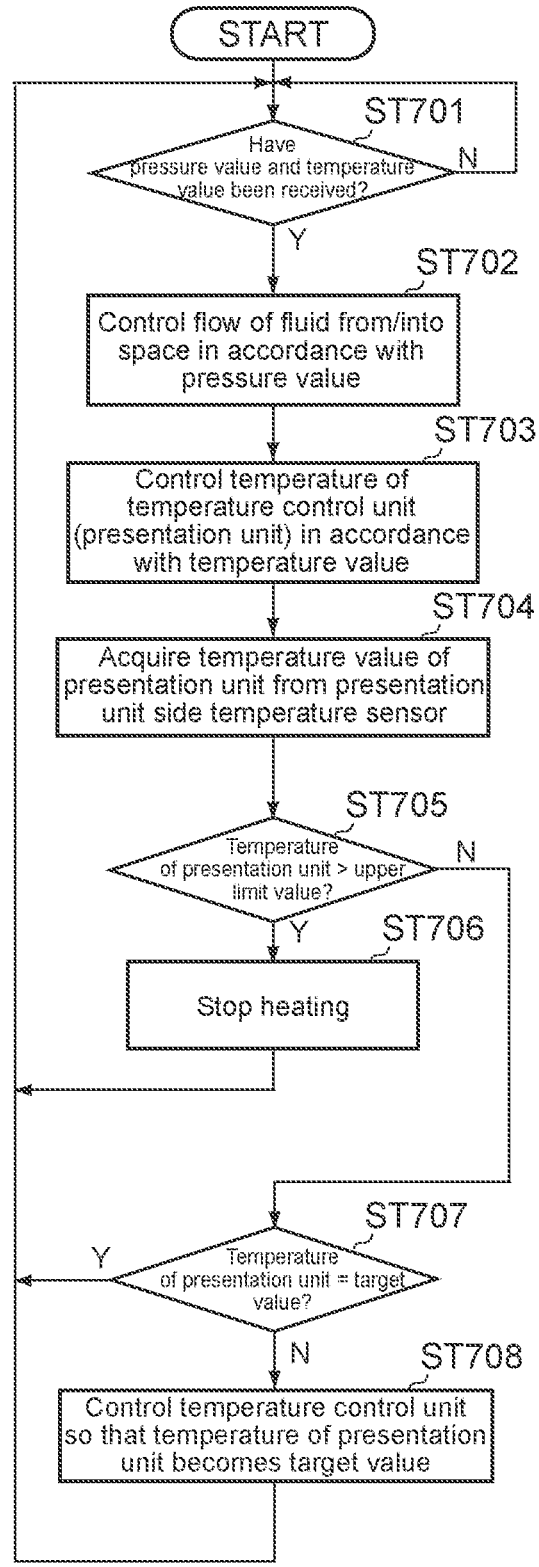
FIG. 21 A flowchart showing processing of the tactile presentation apparatus according to the fifth embodiment.

Next, processing of the control unit 5 of the tactile presentation apparatus 14 according to the fifth embodiment will be described. FIG. 21 is a flowchart showing processing of the tactile presentation apparatus 14 according to the fifth embodiment.

As shown in FIG. 21, in a case where the control unit 5 of the tactile presentation apparatus 14 has received the pressure value and the temperature value of the detection unit 20 from another tactile presentation apparatus 14 (directly or indirectly via the server apparatus or the like) (YES in Step 701), the control unit 5 of the tactile presentation apparatus 14 drives the actuator 34 of the presentation unit 30 and controls the flow of the fluid from/into the space 31 in accordance with the pressure value (Step 702).

Next, the control unit 5 controls the temperature of the temperature control unit 38 in accordance with the temperature value and controls the temperature of the presentation unit 30 (in particular, the deformation layer 32) (Step 703).

Next, the control unit 5 acquires a temperature value of the presentation unit 30 (in particular, the deformation layer 32) from the presentation unit side temperature sensor 39 (Step 704). Next, the control unit 5 determines whether the temperature value of the presentation unit 30 exceeds the upper limit value (Step 705). The upper limit value is a threshold (e.g., about 45° C.) set for safety control to suppress excessive heating of the presentation unit 30 (in particular, the deformation layer 32) and prevent a burn and the like of the user.

In a case where the temperature value of the presentation unit 30 exceeds the upper limit value (YES in Step 705), the control unit 5 stops heating of the presentation unit 30 by the temperature control unit 38 (Step 705). Alternatively, in this case, the control unit 5 may slightly reduce the temperature of the presentation unit 30 by cooling it through the temperature control unit 38. Then, the control unit 5 returns to Step 301.

In Step 705, in a case where the temperature value of the presentation unit 30 is equal to or lower than the upper limit value (NO in Step 705), the control unit 5 shifts to Step 707. In Step 707, the control unit 5 determines whether the temperature value of the presentation unit 30 is a desired value (or an approximation value of the desired value).

The desired value is a value that is set for feedback control to correctly control the temperature by the temperature control unit 38 and correctly control the temperature of the presentation unit 30 (in particular, the deformation layer 32). The desired value is a value that is set to the temperature of the presentation unit 30 on the basis of the temperature value received from the other tactile presentation apparatus 14. The desired value increases in proportion to the received temperature value (but does not exceed the upper limit value of the temperature).

In a case where the temperature value of the presentation unit 30 is the desired value (or the approximation value) (YES in Step 7070), the control unit 5 returns to Step 701.

On the other hand, in a case where the temperature value of the presentation unit 30 is not the desired value (or the approximation value) (NO in Step 707), the control unit 5 drives the temperature control unit 38 and controls the temperature of the presentation unit 30 so that the temperature value of the presentation unit 30 becomes the desired value (or the approximation value) (Step 708).

At this time, in a case where the temperature value of the presentation unit 30 is above the desired value, the control unit 5 may reduce the temperature of the presentation unit 30 by the use of the temperature control unit 38. On the other hand, in a case where the temperature value of the presentation unit 30 is below the desired value, the temperature control unit 38 may increase the temperature of the presentation unit 30. Then, the control unit 5 returns to Step 701.

<Actions, Etc.>

In the fifth embodiment, the safety control (see Steps 704 to 706) can suppress excessive heating by the presentation unit 30 (deformation layer 32) and can prevent a burn and the like of the user. Moreover, in the fifth embodiment, feedback control (Steps 704, 707 to 708) can correctly perform the temperature control of the presentation unit 30 by the temperature control unit 38, and an appropriate temperature depending on the temperature detected by the other tactile presentation apparatus 14 can be presented to the user.

Although the case where both the safety control and feedback control are performed has been described as to the temperature of the presentation unit 30 in the description of the fifth embodiment, either the safety control or feedback control unit 5 may be performed.

It should be noted that the fifth embodiment can be combined with the second embodiment (the safety control and feedback control by the pressure sensor 21) and the third embodiment (the safety control and feedback control by the distance sensor 37).

Sixth Embodiment

Next, a sixth embodiment of the present technology will be described. In the fourth embodiment and the fifth embodiment, the case where the temperature of the presentation unit 30 (deformation layer 32) is directly controlled has been described. On the other hand, in the sixth embodiment, a case where the temperature of the presentation unit 30 (deformation layer 32) is indirectly controlled by controlling the temperature of the fluid in the space 31 will be described.

Figure 22:
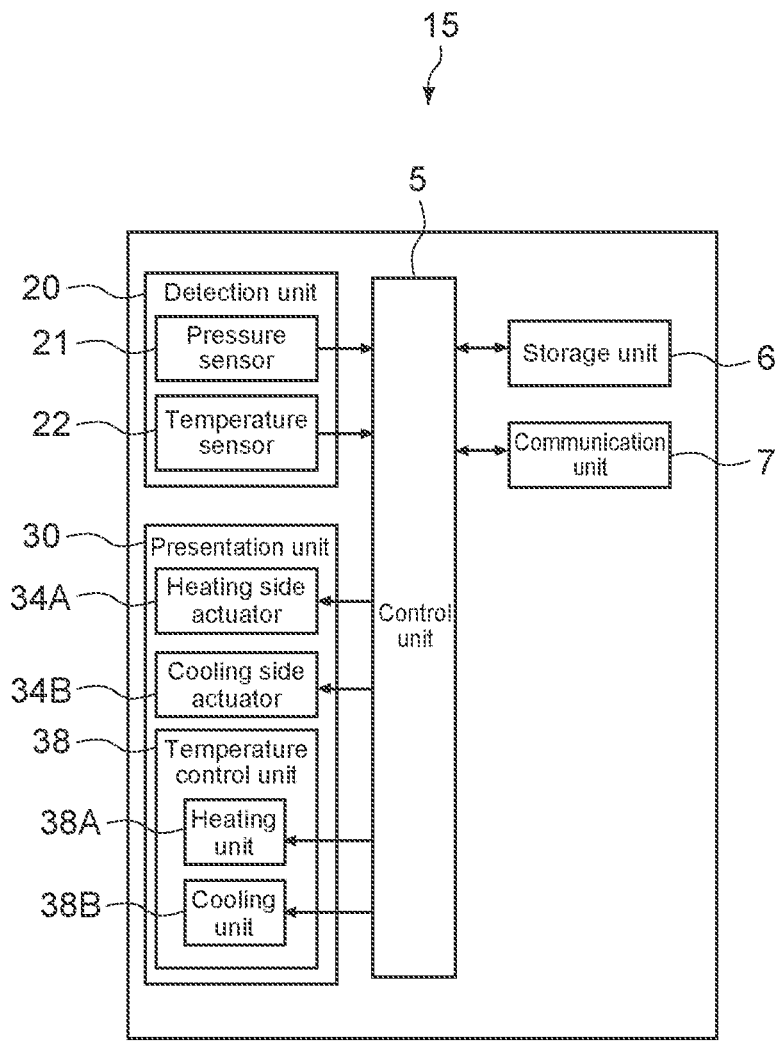
FIG. 22 A block diagram showing an internal configuration of a tactile presentation apparatus according to a sixth embodiment.
Figure 23:
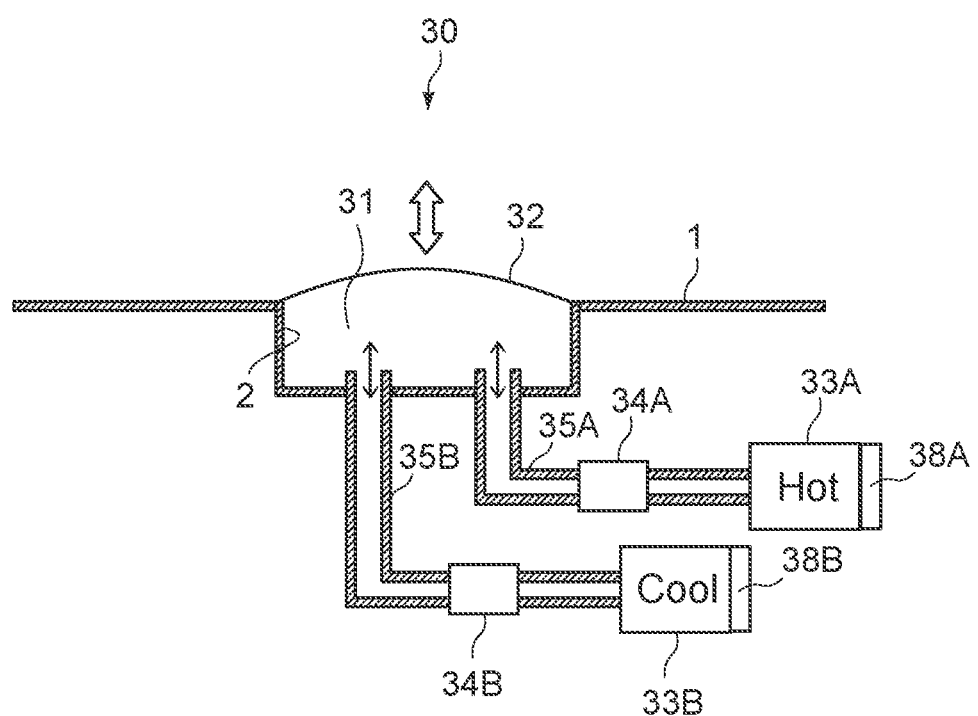
FIG. 23 A schematic view showing a configuration of a presentation unit at the tactile presentation apparatus according to the sixth embodiment.

FIG. 22 is a block diagram showing an internal configuration of a tactile presentation apparatus 15 according to the sixth embodiment. FIG. 23 is a schematic view showing a configuration of the presentation unit 30 in the tactile presentation apparatus 15 according to the sixth embodiment.

As shown in these figures, in the sixth embodiment, the presentation unit 30 includes a heating side supply source 33A, a heating side actuator 34A, a heating side pipe 35A, and a heating unit 38A. Moreover, the presentation unit 30 includes a cooling side supply source 33B, a cooling side actuator 34B, a cooling side pipe 35B, and a cooling unit 38B.

The heating side supply source 33A (e.g., a tank) is configured to be capable of supplying the space 31 with the heated fluid. The heating side actuator 34A is attached to the heating side pipe 35A and controls the flow of the fluid from/into the space 31 in accordance with the control of the control unit 5. The heating side pipe 35A is provided so as to couple the space 31 with the heating side supply source 33A.

The heating unit 38A is a part of the temperature control unit 38. The heating unit 38A is attached to the heating side supply source 33A, and configured to be capable of heating the fluid in the heating side supply source 33A in accordance with the control of the control unit 5. Although the heating unit 38A is constituted by a Peltier device, a heater, and the like, for example, any apparatus may be employed as long as it can heat the fluid.

By heating of the heating unit 38A, a fluid at a constant temperature or more is retained inside the heating side supply source 33A. The temperature of the fluid inside the heating side supply source 33A is set to be, for example, 40° C. or more.

The cooling side supply source 33B (e.g., a tank) is configured to be capable of supplying the space 31 with the cooled fluid. The cooling side actuator 34B is attached to the cooling side pipe 35B and controls the flow of the fluid from/into the space 31 in accordance with the control of the control unit 5. The cooling side pipe 35B is provided so as to couple the space 31 with the cooling side supply source 33B.

The cooling unit 38B is a part of the temperature control unit 38. The cooling unit 38B is attached to the cooling side supply source 33B, and is configured to be capable of cooling a fluid in the cooling side supply source 33B in accordance with the control of the control unit 5. The cooling unit 38B is constituted by a Peltier device, a heater, and the like, for example, and any apparatus may be employed as long as it can cool the fluid.

By cooling of the cooling unit 38B, a fluid at a constant temperature or less is retained inside the cooling side supply source 33B. The temperature of the fluid inside the cooling side supply source 33B is set to, for example, 25° C. or less.

<Operation Description>

Processing of the control unit 5 of the tactile presentation apparatus 15 according to the sixth embodiment will be described.

[In Case of Expansion while Heating the Presentation Unit 30 (Deformation Layer 32)]

Figure 24:
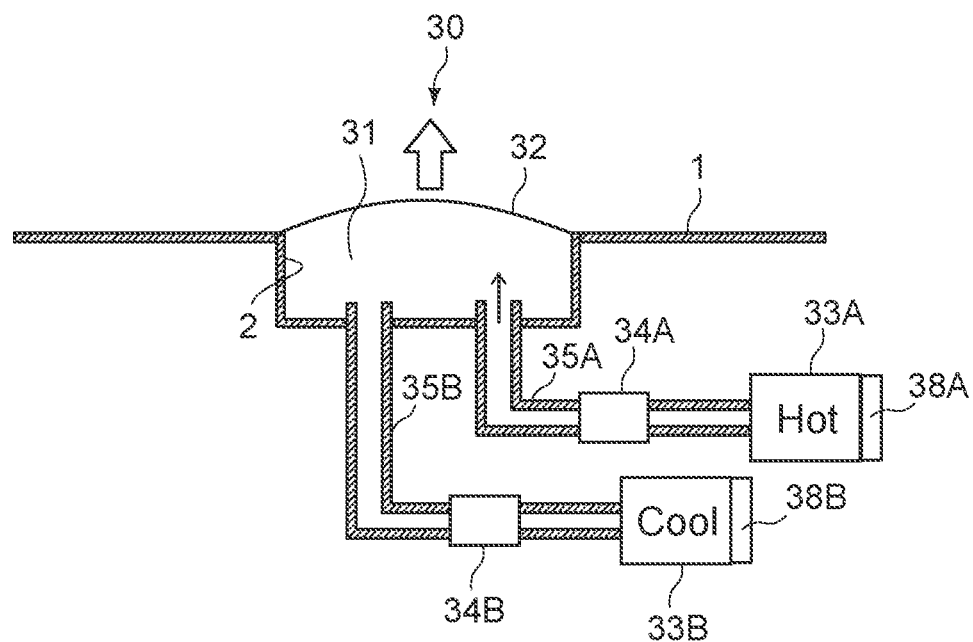
FIG. 24 A diagram showing a state when the presentation unit is expanded while being heated.

First of all, a case of expanding the presentation unit 30 (deformation layer 32) while heating it will be described. FIG. 24 is a diagram showing a state when the presentation unit 30 is expanded while being heated.

In this case, the control unit 5 drives the heating side actuator 34A in a forward direction (a direction from the side of the supply source 33 to the side of the space 31) while stopping the cooling side actuator 34B. Accordingly, the space 31 of the presentation unit 30 is supplied with the heated fluid, and the presentation unit 30 (deformation layer 32) expands while being heated.

It should be noted that only simply supplying the fluid in the heating side supply source 33A to the space 31 may cause excessive heating. Thus, in this case, when the control unit 5 drives the heating side actuator 34A in the forward direction, the cooling side actuator 34B may be lightly driven in the forward direction (driving of the cooling side actuator 34B is lighter than driving of the heating side actuator 34A).

[In Case of Expansion while Cooling the Presentation Unit 30 (Deformation Layer 32)]

Figure 25:
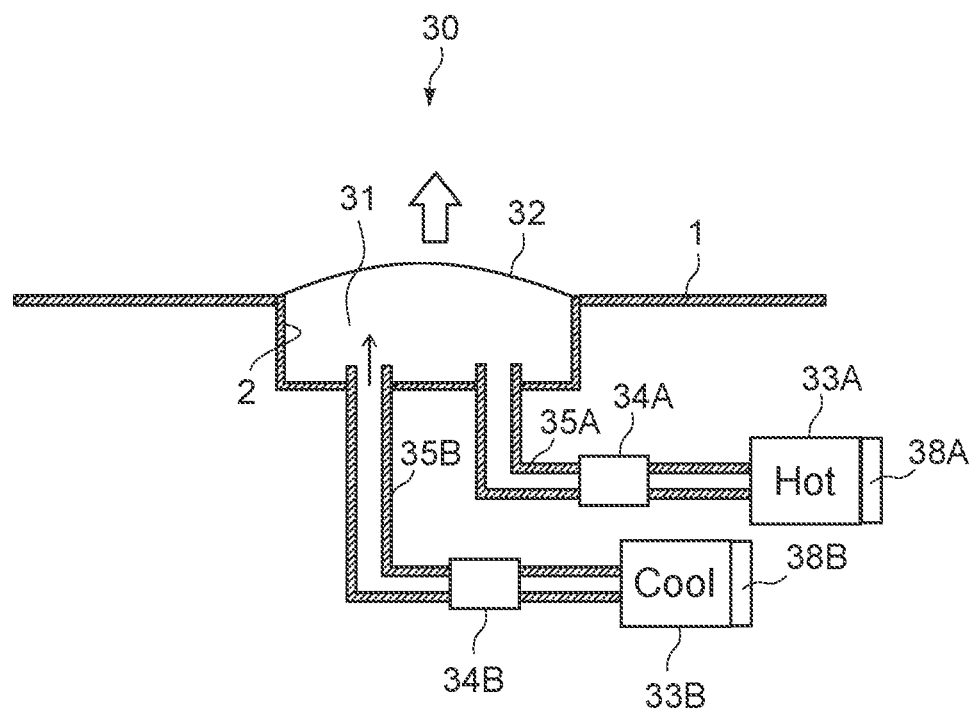
FIG. 25 A diagram showing a state when the presentation unit is expanded while being cooled.

Next, a case of expanding the presentation unit 30 (deformation layer 32) while cooling it will be described. FIG. 25 is a diagram showing a state when the presentation unit 30 is expanded while being cooled.

In this case, the control unit 5 drives the cooling side actuator 34B in the forward direction while stopping the heating side actuator 34A. Accordingly, the cooled fluid is supplied with the space 31 of the presentation unit 30, and the presentation unit 30 (deformation layer 32) expands while being cooled.

It should be noted that only simply supplying the fluid in the cooling side supply source 33B to the space 31 may cause excessive cooling. Thus, in this case, when the control unit 5 drives the cooling side actuator 34B in the forward direction, the heating side actuator 34A may be lightly driven in the forward direction (driving of the heating side actuator 34A is lighter than driving of the cooling side actuator 34B).

[In Case of Contraction while Heating the Presentation Unit 30 (Deformation Layer 32)]

Figure 26:
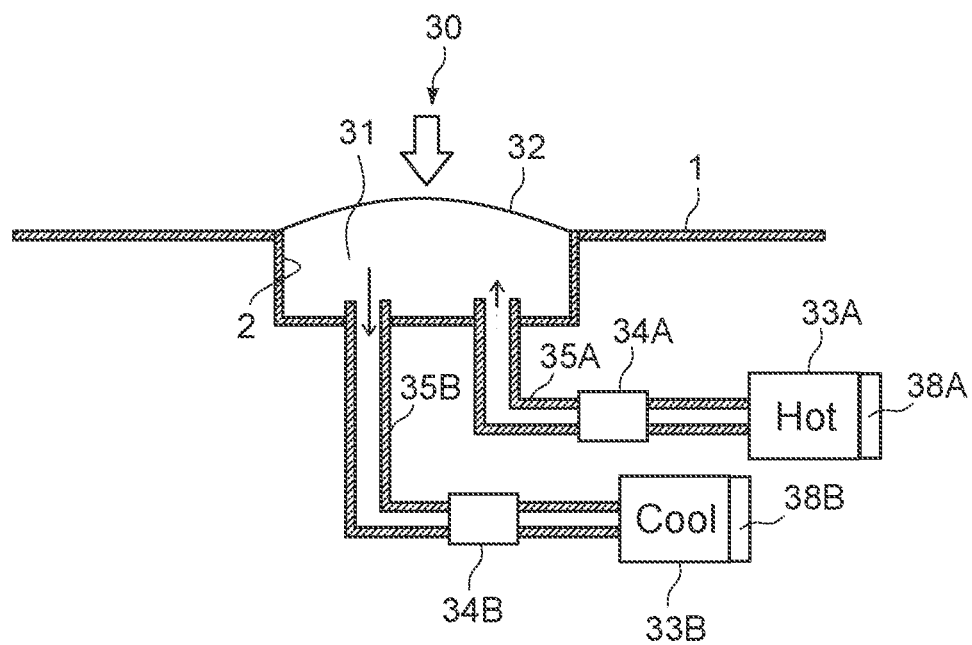
FIG. 26 A diagram showing a state when the presentation unit is contracted while being heated.

Next, a case of contracting the presentation unit 30 (deformation layer 32) while heating it will be described. FIG. 26 is a diagram showing a state when the presentation unit 30 is contracted while being heated.

In this case, the control unit 5 drives the cooling side actuator 34B in a reverse direction (a direction from the side of the space 31 to the side of the supply source 33) and at the same time drives the heating side actuator 34A in the forward direction more lightly than on the cooling side. Accordingly, the space 31 of the presentation unit 30 is supplied with the heated fluid while the whole amount of the fluid in the space 31 is reduced. Therefore, the presentation unit 30 (deformation layer 32) contracts while being heated.

[In Case of Contraction while Cooling the Presentation Unit 30 (Deformation Layer 32)]

Figure 27:
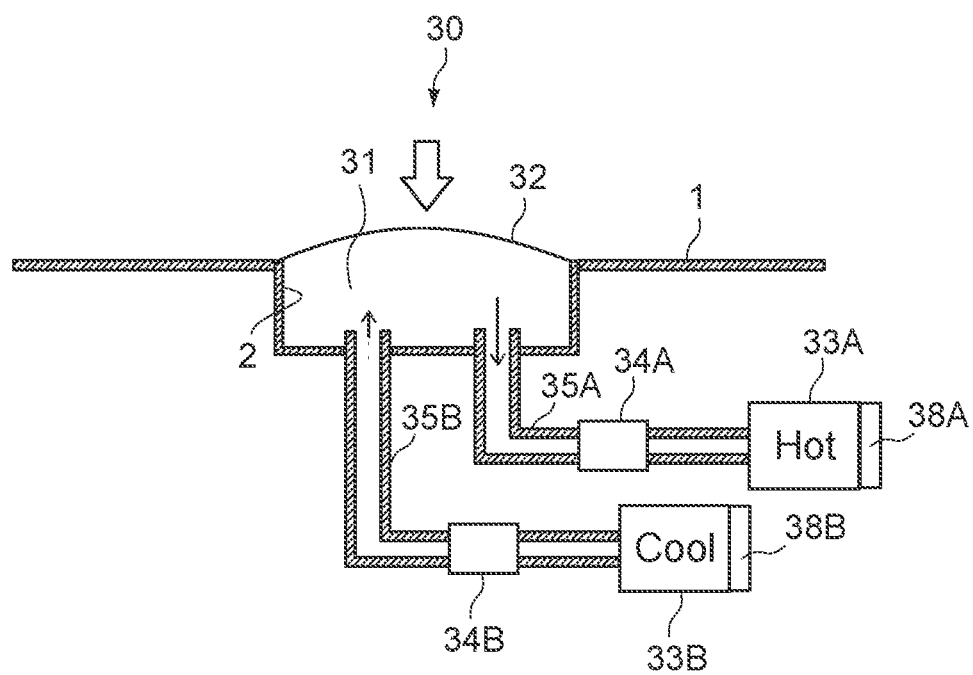
FIG. 27 A diagram showing a state when the presentation unit is contracted while being cooled.

Next, a case of contracting the presentation unit 30 (deformation layer 32) while cooling it will be described. FIG. 27 is a diagram showing a state when the presentation unit 30 is contracted while being cooled.

In this case, the control unit 5 drives the reverse direction in the heating side actuator 34A and at the same time drives the cooling side actuator 34B in the forward direction more lightly than on the cooling side. Accordingly, the cooled fluid is supplied to the space 31 of the presentation unit 30 while the whole amount of the fluid in the space 31 is reduced. Therefore, the presentation unit 30 (deformation layer 32) contracts while being cooled.

[When the Presentation Unit 30 is Heated while Keeping an Expansion Rate of the Presentation Unit 30 (Deformation Layer 32)]

Figure 28:
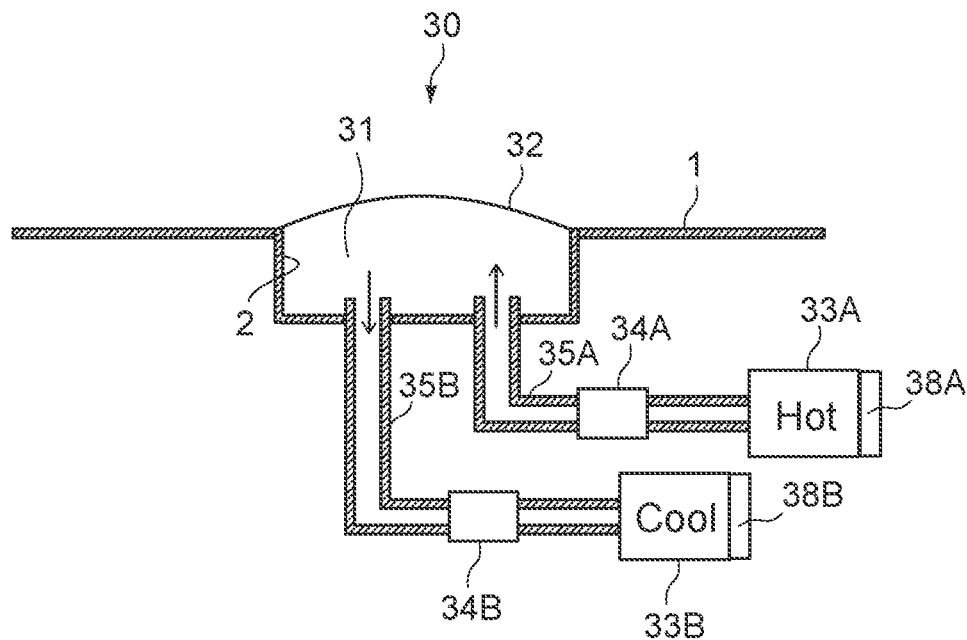
FIG. 28 A diagram showing a state when the presentation unit is heated while keeping an expansion rate of the presentation unit.

Next, a case where the presentation unit 30 is heated while keeping an expansion rate of the presentation unit 30 (deformation layer 32) will be described. FIG. 28 is a diagram showing a state when the presentation unit 30 is heated while keeping the expansion rate of the presentation unit 30.

In this case, the control unit 5 drives the heating side actuator 34A in the forward direction and at the same time drives the cooling side actuator 34B in the reverse direction at the same strength as the heating side. Accordingly, the space 31 of the presentation unit 30 is supplied with the heated fluid while keeping the whole amount of the fluid in the space 31. Therefore, the presentation unit 30 is heated while keeping the expansion rate of the presentation unit 30.

[When the Presentation Unit 30 is Cooled while Keeping the Expansion Rate of the Presentation Unit 30 (Deformation Layer 32)]

Figure 29:
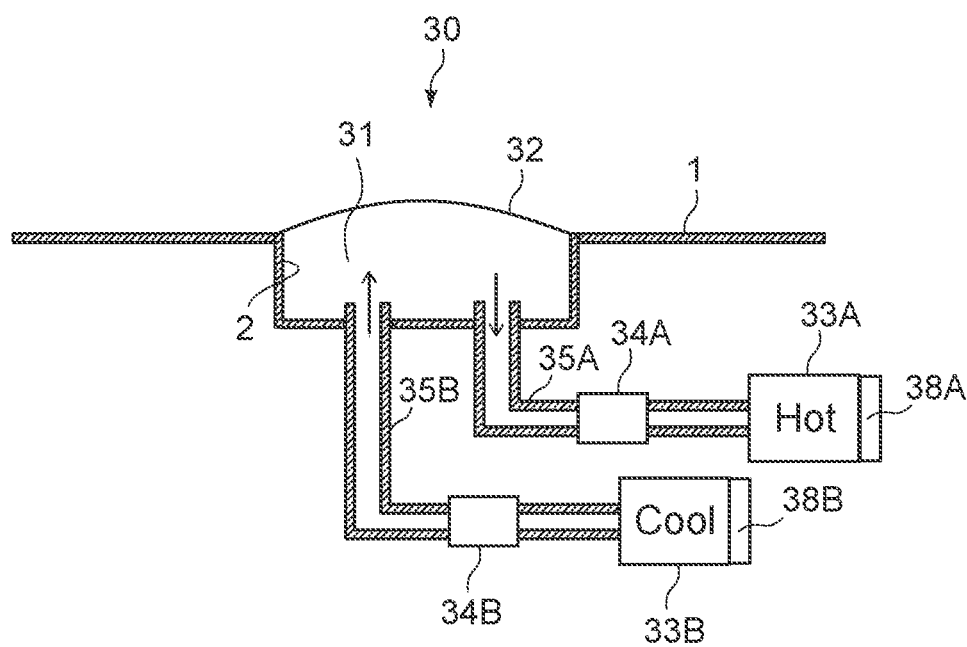
FIG. 29 A diagram showing a state when the presentation unit is cooled while keeping the expansion rate of the presentation unit.

Next, a case where the presentation unit 30 is cooled while keeping the expansion rate of the presentation unit 30 (deformation layer 32) will be described. FIG. 29 is a diagram showing a state when the presentation unit 30 is cooled while keeping the expansion rate of the presentation unit 30.

In this case, the control unit 5 drives the cooling side actuator 34B in the forward direction and at the same time drives the heating side actuator 34A in the reverse direction at the same strength as the cooling side. Accordingly, the cooled fluid is supplied to the space 31 of the presentation unit 30 while keeping the whole amount of the fluid in the space 31. Therefore, the presentation unit 30 is cooled while keeping the expansion rate of the presentation unit 30.

Also in the sixth embodiment, as in the fourth embodiment, not only a tactile sensation based on the force of the other user, but also a temperature sensation based on the temperature of the other user can be presented to the user.

It should be noted that the sixth embodiment can be combined with the second embodiment (the safety control and feedback control by the pressure sensor 21), the third embodiment (the safety control and feedback control by the distance sensor 37), the fourth embodiment (the direct control of the temperature of the presentation unit 30), and the fifth embodiment (the safety control and feedback control by the temperature sensor 22).

Seventh Embodiment

Next, a seventh embodiment of the present technology will be described. In a tactile presentation apparatus 16 according to the seventh embodiment, the configuration of the detection unit 20 is different from that of each of the above-mentioned embodiments.

Figure 30:
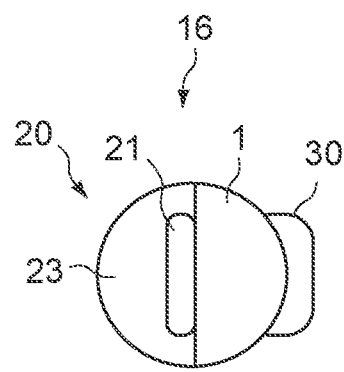
FIG. 30 A diagram showing a tactile presentation apparatus according to a seventh embodiment.
Figure 31:
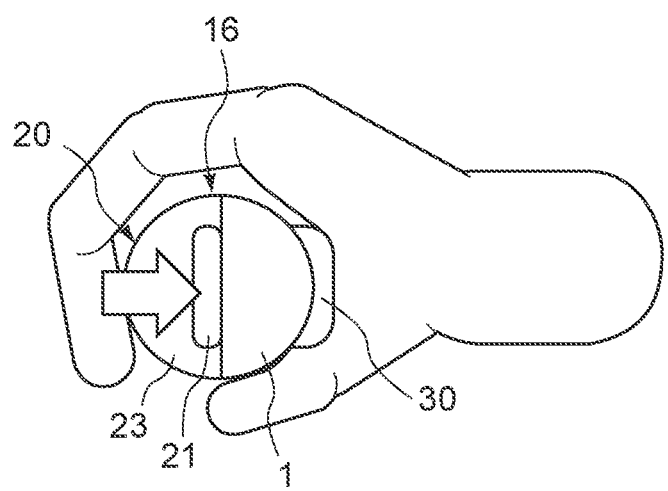
FIG. 31 A diagram showing a state when a user grips the tactile presentation apparatus.

FIG. 30 is a diagram showing the tactile presentation apparatus 16 according to the seventh embodiment. FIG. 31 is a diagram showing a state when the tactile presentation apparatus 16 is gripped by the user.

As shown in these figures, the detection unit 20 of the tactile presentation apparatus 16 includes a deformation unit 23 provided on the surface side and a pressure sensor 21 provided inward from the deformation unit 23. The deformation unit 23 is configured to be deformable with a user force. A material used for the deformation unit 23 can be a relatively soft material such as a rubber, gel, and sponge (softer than the material used for the casing 1).

The pressure sensor 21 is configured to be capable of detecting a user force (pressure) via the deformation unit 23 and is configured to be capable of outputting the detected pressure value to the control unit 5.

In the seventh embodiment, the pressure sensor 21 detects a user force (pressure) via the deformation unit 23. Therefore, the dynamic range of the pressure sensor 21 is wider and changes in user force can be finely detected. Thus, on the side of the presentation unit 30, such finer force changes can be presented to the user (finer control can be made as fluid control).

It should be noted that the seventh embodiment can be combined with each of the above-mentioned embodiments (first to sixth embodiments).

Application Examples

Next, an application example of how the tactile presentation system 100 (the tactile presentation apparatuses 10 to 16) is used will be described.

[Usage with Video Phone Call]

Figure 32:
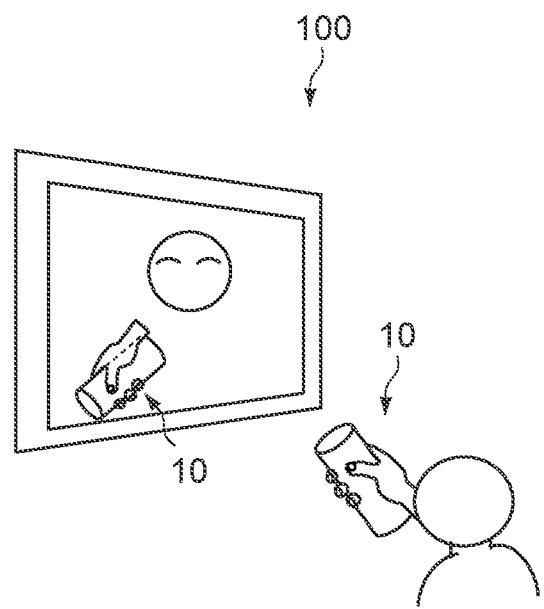
FIG. 32 A diagram showing a state when the tactile presentation system is used with a video phone call.

FIG. 32 is a diagram showing a state when the tactile presentation system 100 is used with a video phone call.

In FIG. 32, for example, two people know each other. For example, one of the people is a grand father or mother and the other is his/her grandchild. Both are located remotely from each other, and therefore they cannot directly communicate by touching. However, they can get a feeling, e.g., a feeling of touching each other virtually (shaking hands) and communicate deeply by gripping their tactile presentation apparatuses 10 (or 11 to 16, which will be omitted in the description of the application example below).

Moreover, in FIG. 32, for example, two people join a video meeting for business. The two people do not know each other and are not close to each other. However, they can get a feeling, e.g., a feeling of shaking hands and get closer to each other by gripping their tactile presentation apparatuses 10 at the beginning of the meeting.

Moreover, in FIG. 32, for example, one of the people is a celebrity and the other is a fan joining a handshake event of the celebrity. When both grip their tactile presentation apparatuses 10, the fan can feel as if the fan actually shook hands with the celebrity. In addition, the safety of the celebrity can be secured.

Moreover, in FIG. 32, for example, one (person on the screen) of the people is a virtual character (e.g., a virtual idol or a comic character) and the other is an existing person. In this case, the tactile presentation apparatus 10 used by the virtual character (the tactile presentation apparatus 10 on the screen) is also virtual.

When the existing person grips the tactile presentation apparatus 10, for example, the virtual character smiles accordingly and the virtual character grips back the tactile presentation apparatus 10 (virtual). The existing person can feel as if the existing person could shake hands with the virtual character.

[Usage at Event Venue]

For example, at a concert venue (event venue), a singer uses a single tactile presentation apparatus 10. An audience at the concert venue individually uses their own tactile presentation apparatuses 10.

When the singer grips the tactile presentation apparatus 10, a tactile sensation (force) depending on its strength is presented to the audience through the tactile presentation apparatuses 10. The audience feels as if the singer touched them and gets excited.

Meanwhile, when the audience individually grips the tactile presentation apparatuses 10, a total value of forces detected by the tactile presentation apparatuses 10 on the audience side is determined and a tactile sensation (force) depending on the strength of the total value is presented to the singer. The singer can check whether the audience gets excited on the basis of that tactile sensation (force). When the audience gets excited, it contributes to a performance enhancement.

The total value of the forces from the audience may be used, for example, as information for changing lights or characters of electronic signs, which are located at places in the concert venue, e.g., next to the singer or behind the singer, in addition to being presented to the singer. For example, when the total value of the forces from the audience becomes equal to or larger than a threshold, the lights blink violently or characters for making the audience more excited are displayed on the electronic signs.

The total value of the forces from the audience can also be presented to the audience, not the singer. In this case, on the basis of the total value of the forces from the audience, presentation units 30 of the tactile presentation apparatuses 10 of the audience expand/contract and the tactile sensation (force) is presented to the audience. The audience can see that the other audience gets excited through a tactile sensation, and therefore the audience can feel connection with the other audience.

Although the case where the audience is located at the concert venue has been described hereinabove, the audience does not necessarily need to be located at the concert venue. For example, there are a case where the concert takes place without an audience (e.g., due to virus) and a case where the concert takes place with an audience but some people cannot come to the concert venue for their own reasons (e.g., they have urgent business on that day and they cannot come to the venue or they cannot get the tickets).

In such a case, some people of the audience not located at the concert venue can view the concert (e.g., as a live broadcast) through a monitor, for example, and can perform tactile communication with the singer and the other audience by the use of the tactile presentation apparatuses 10. In this case, the audience can feel the concert excitement as a tactile sensation even when the audience is not present at the concert venue.

Here, in a case where the concert takes place without an audience, there is a problem in that it is difficult for the singer to know whether the audience gets excited. On the other hand, in the present technology, the singer can easily check whether the audience gets excited as a tactile sensation (force) presented by the tactile presentation apparatuses 10.

Although the case where the singer and the concert venue exist has been described hereinabove, these may be a virtual singer (e.g., a virtual idol or a comic character) and a virtual concert venue (video). In this case, the audience can view the concert of the virtual singer through a monitor (e.g., as a live broadcast) and can perform tactile communication with the virtual singer and the existing other audience by the use of the tactile presentation apparatus 10.

Various Modified Examples

Figure 33:
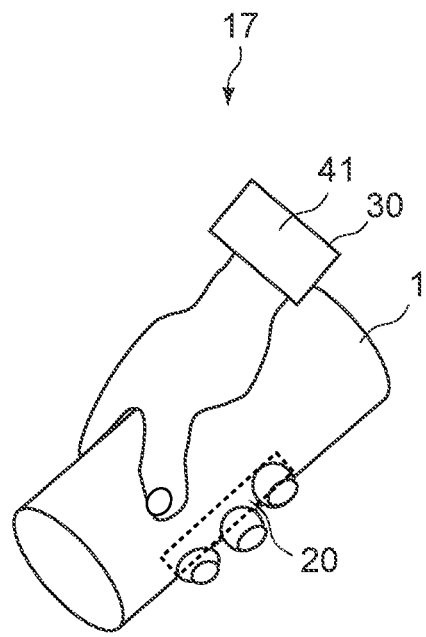
FIG. 33 A diagram showing another example of the tactile presentation apparatus.

FIG. 33 is a diagram showing another example of the tactile presentation apparatus.

A tactile presentation apparatus 17 shown in FIG. 33 includes a casing 1 and a wristband 41. A detection unit 20 is provided in the casing 1 (as in each of the above-mentioned embodiments). Meanwhile, the presentation unit 30 is provided on an inner peripheral surface side of the wristband 41 in the wristband 41 (disposed at a position different from the positions of the detection unit 20 and the presentation unit 30).

The presentation unit 30 (deformation layer 32) presents a tactile sensation (force) to the user's wrist by expanding/contracting in accordance with a gripping force of the other user, which is detected by a detection unit 20 of another tactile presentation apparatus 17.

Figure 34:
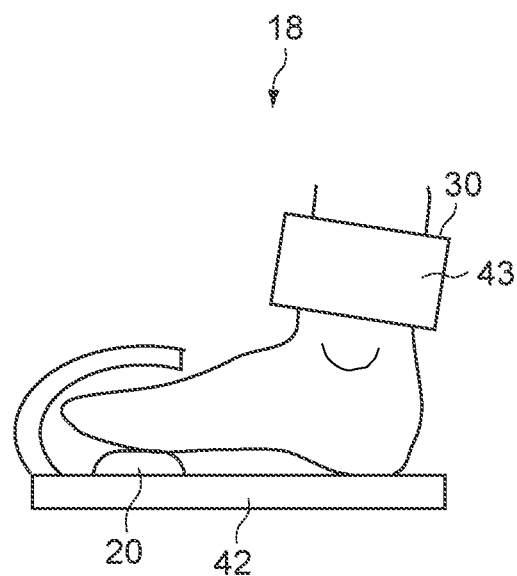
FIG. 34 A diagram showing a still another example of the tactile presentation apparatus.

FIG. 34 is a diagram showing a still another example of the tactile presentation apparatus.

A tactile presentation apparatus 18 shown in FIG. 34 includes a footwear-type (e.g., a slipper or shoe) apparatus 42 and an ankle band 43. Detection units 20 are provided at positions of the footwear-type apparatus 42, which correspond to a sole (e.g., foot fingers and heel). Meanwhile, the presentation unit 30 is provided on an inner peripheral surface side of the ankle band 43 in the ankle band 43 (the detection units 20 and the presentation unit 30 are disposed on different positions).

The presentation unit 30 (deformation layer 32) presents a tactile sensation (force) to a foot neck of the user by expanding/contracting in accordance with a press force of the other user detected by detection units 20 of another tactile presentation apparatus 18.

Figure 35:
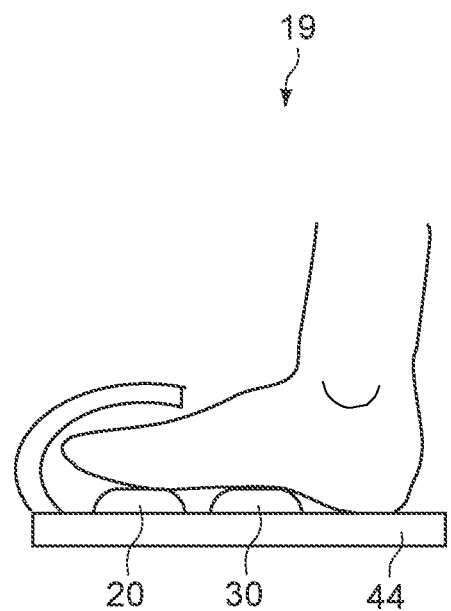
FIG. 35 A diagram showing a still another example of the tactile presentation apparatus.

FIG. 35 is a diagram showing a still another example of the tactile presentation apparatus.

A tactile presentation apparatus 19 shown in FIG. 35 includes a footwear-type (e.g., a slipper or shoe) apparatus 44. Detection units 20 are provided at positions of the footwear-type apparatus 44, which correspond to foot fingers, for example. Meanwhile, the presentation unit 30 is provided at a position of the footwear-type apparatus 44, which corresponds to a position different from the positions of the detection units 20, for example, an arch of the foot.

The presentation unit 30 (deformation layer 32) expands/contracts in accordance with a press force of the other user, which is detected by detection units 20 of another tactile presentation apparatus 19 to thereby present a tactile sensation (force) to the sole (arch) of the user.

The tactile presentation apparatus 10 (or 11 to 16) shown in FIG. 2 or the like, the tactile presentation apparatus 17 shown in FIG. 33, the tactile presentation apparatus 18 shown in FIG. 34, and the tactile presentation apparatus 19 shown in FIG. 35 may be respectively combined.

For example, the one tactile presentation apparatus may be the tactile presentation apparatus 10 (or 11 to 16) shown in FIG. 2 or the like and the other tactile presentation apparatus may be the tactile presentation apparatus 17 shown in FIG. 33 (they can be combined freely).

In this case, when one user grips the tactile presentation apparatus 10 shown in FIG. 2 or the like, a tactile sensation is presented to the wrist of the other user through the wristband 41 at the tactile presentation apparatus 17 shown in FIG. 33. Moreover, when the other user grips the tactile presentation apparatus 17 shown in FIG. 33, a tactile sensation is presented to the palm of the one user at the tactile presentation apparatus 10 shown in FIG. 2 or the like.

Figure 36:
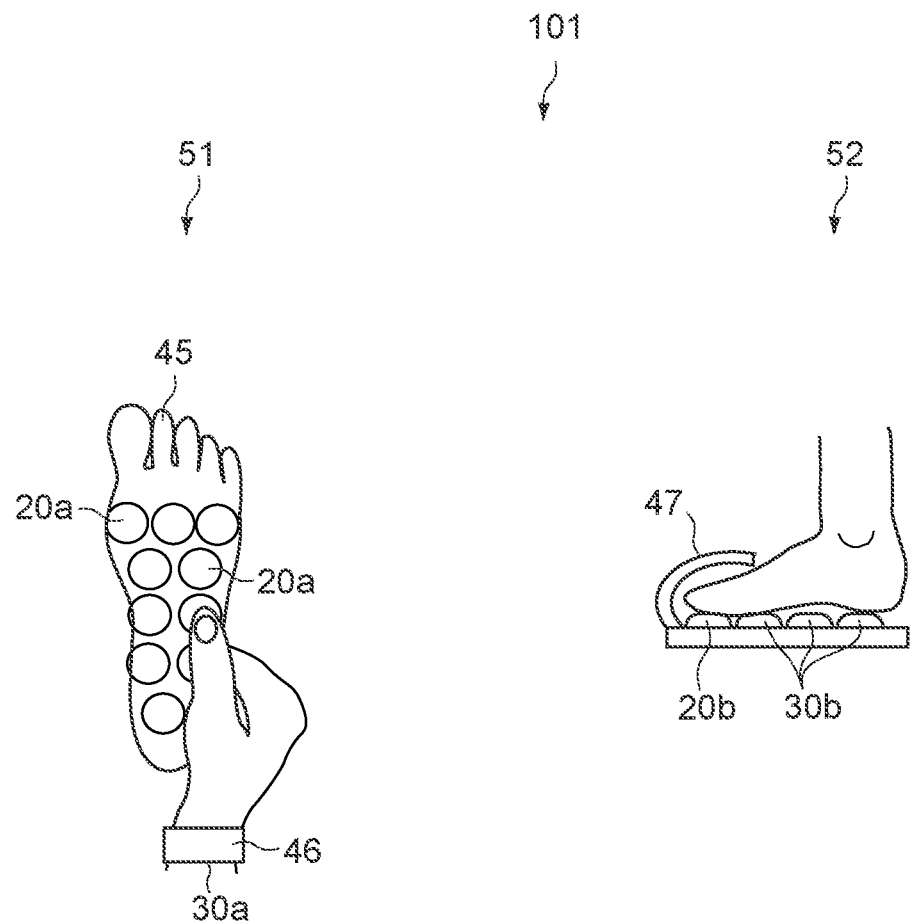
FIG. 36 A diagram showing a still another example of the tactile presentation system.

FIG. 36 is a diagram showing a still another example of the tactile presentation system. A tactile presentation system 101 shown in FIG. 36 is used for medical care (palpation).

As shown in FIG. 36, the tactile presentation system 101 includes a first tactile presentation apparatus 51 used by a practitioner and a second tactile presentation apparatus 52 used by a patient.

The first tactile presentation apparatus 51 includes a foot-shaped apparatus 45 and a wristband 46. A plurality of first detection units 20a is disposed at positions of the foot-shaped apparatus 45, which correspond to foot pressure points, respectively. On the other hand, a first presentation unit 30a is provided on the inner peripheral surface side of the wristband 41 (the first detection units 20a and the first presentation unit 30a are disposed at different positions).

The second tactile presentation apparatus 52 includes a footwear-type (e.g., a slipper or shoe) apparatus 47. The second detection unit 20b is provided at a position of the footwear-type apparatus 47, which corresponds to the foot fingers, for example. Meanwhile, the plurality of second presentation units 30b is provided at positions of the footwear-type apparatus 47, which are different from those of the second detection unit 20b and correspond to the foot pressure points, respectively.

First of all, the practitioner pushes one of the first detection units 20a (foot pressure points) in the first tactile presentation apparatus 51. Then, in the second tactile presentation apparatus 52, the second presentation unit 30b corresponding to the pushed first detection unit 20a expands and pushes the foot pressure point of the patient with the pushing force.

When the foot pressure point is pushed and the patient feels pain, the patient presses the second detection unit 20b with his/her foot finger voluntarily or automatically due to the pain. Then, the first presentation unit 30a in the first tactile presentation apparatus 51 presents a tactile sensation (force) depending on the press force to the wrist of the examiner.

The practitioner recognizes which foot pressure point the patient reacted on the basis of the tactile sensation (force) transmitted through the wrist, and therefore the practitioner can know a diseased position of the patient.

Figure 37:
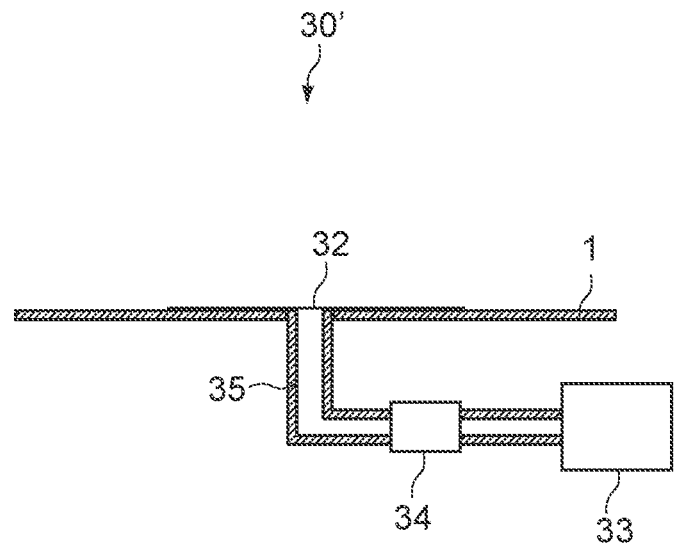
FIG. 37 A diagram showing another example of the presentation unit.
Figure 37:
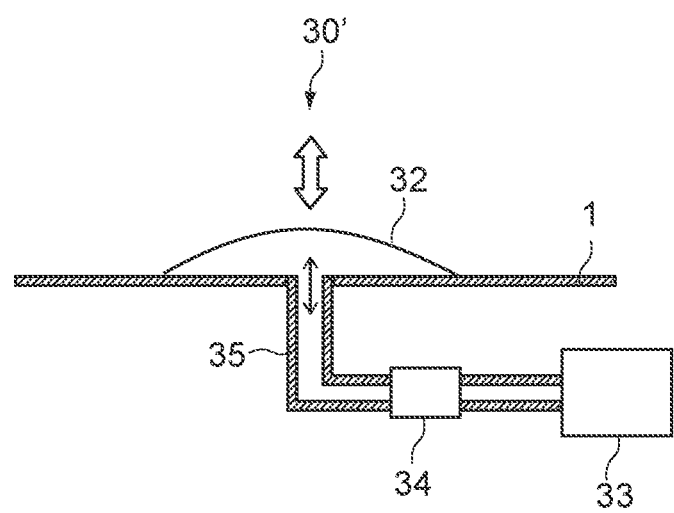

FIG. 37 is a diagram showing another example of the presentation unit. In the upper diagram of FIG. 37, a state when a deformation layer 32 of a presentation unit 30' has contracted is shown. In the lower diagram of FIG. 37, a state when the deformation layer 32 of a presentation unit 30' has expanded is shown.

As shown in FIG. 37, in the presentation unit 30', the casing 1 does not have the recess portion 2 and the space 31 formed by the recess portion 2 is not provided unlike the presentation unit 30 (see FIG. 3 or the like).

The casing 1 has, in its surface, an opening for the pipe 35 to pass therethrough. A deformation layer 2 is provided on the casing 1 to cover the opening (flow channel formed by the pipe 35) at a position corresponding to the opening (pipe 35). An outer peripheral rim of the deformation layer 2 is fixed on the surface of the casing 1 with an adhesion or the like.

Also with the presentation unit 30' shown in FIG. 37, as in the presentation unit 30 shown in FIG. 3 or the like, a tactile sensation can be appropriately presented to the user by expansion/contraction of the deformation layer 2.

In a case where the fluid pressure sensor 36, the distance sensor 37, the temperature control unit 38, the temperature sensor (presentation unit side) 39, and the like are provided in the presentation unit 30' shown in FIG. 37, these members may be provided in the flow channel between the actuator 34 and the deformation layer 2 in the pipe 35, for example. That is, these members may be disposed in the flow channel between the actuator 34 and the deformation layer 2 in the pipe 35 rather than being disposed in the space 31 formed by the recess portion 2. It should be noted that in FIG. 37, the flow channel between the actuator 34 and the deformation layer 2 in the pipe 35 corresponds to the space 31 in the recess portion 2 shown in FIG. 3 or the like (the flow channel between the actuator 34 and the deformation layer 2 in the pipe 35 can be considered as the space 31).

A still another example of the tactile presentation system will be shown.

In the tactile presentation system 100 shown in the first embodiment, the presentation unit 30 of the tactile presentation apparatuses 10 may be a Peltier device serving as the temperature control unit described in the fourth embodiment above. Hereinafter, referring to FIG. 1, the description will be given using the reference signs described in the first embodiment.

As in the first embodiment, the tactile presentation system according to this example is a system for enabling mutual tactile communication to be performed even in a case where a plurality of users is located in places remote from each other. The tactile presentation system according to this example includes a plurality of tactile presentation apparatuses 10 each having a similar configuration. The tactile presentation apparatuses 10 are used by different users, respectively. Here, a case where the number of tactile presentation apparatuses 10 is two will be described.

Hereinafter, in order to especially distinguish the two tactile presentation apparatuses 10, one tactile presentation apparatus 10 will be referred to as a first tactile presentation apparatus 10a and another tactile presentation apparatus 10 will be referred to as a second tactile presentation apparatus 10b. Moreover, in order to distinguish the two users, the user who operates the first tactile presentation apparatus 10a will be referred to as a first user and the user who operates the second tactile presentation apparatus 10b will be referred to as a second user. Moreover, in the first tactile presentation apparatus 10a and the second tactile presentation apparatus 10b, in order to distinguish the respective units (e.g., the detection unit 20, the presentation unit 30) and the like having similar configurations, the wordings "first . . . " and "second . . . " will be used.

In this example, the tactile presentation apparatus 10 includes a detection unit 20 and a presentation unit 30.

As in the first embodiment, the detection unit 20 includes a pressure sensor.

The presentation unit 30 is a Peltier device serving as a temperature control unit described in the above-mentioned fourth embodiment.

In the tactile presentation system according to this example, a second Peltier device that is a second presentation unit 30b of the second tactile presentation apparatus 10b held by the second user is controlled to be a temperature depending on a first pressure value detected when the first user grips the first tactile presentation apparatus 10a. Moreover, a first Peltier device that is a first presentation unit 30a of the first tactile presentation apparatus 10a held by the first user is controlled to be a temperature depending on a second pressure value detected when the second user grips the second tactile presentation apparatus 10b.

In this manner, temperature presentation at the other tactile presentation apparatus may be performed in accordance with the pressure value detected by the one tactile presentation apparatus. That is, without reproducing the temperature value detected by the one tactile presentation apparatus at the other tactile presentation apparatus as it is, the user force gripping the one tactile presentation apparatus may be converted into the temperature and presented to the user gripping the other tactile presentation apparatus.

Accordingly, the temperature presentation using the Peltier device of the tactile presentation apparatus held by him/herself enables the user on the receiving side to feel the gripping force of the user on the sending side more clearly.

In addition, as the gripping force increases, in other words, the detected pressure value increases, the temperature presentation may be performed so that the presented temperature becomes higher. Hereinafter, a specific example will be described, though numeric values shown below are merely examples and not limitative.

When the first user grips the first tactile presentation apparatus 10a with a pressure value A, in the second tactile presentation apparatus 10b, the second Peltier device (second presentation unit 30) is controlled so that the temperature of a portion held in contact with the skin of the second user of the second presentation unit 30 increases by 1° C. For example, the second Peltier device is controlled so that such a temperature becomes 34° C. to 35° C.

When the first user further grips the first tactile presentation apparatus 10a with a pressure value B larger than the pressure value A, in the second tactile presentation apparatus 10b, the temperature of a portion held in contact with the skin of the second user of the second presentation unit 30 is controlled to increase by 2° C. For example, the second Peltier device is controlled so that such a temperature becomes 35° C. to 37° C.

A still another example of the tactile presentation system will be shown.

In the tactile presentation system 100 shown in the above-mentioned first embodiment, the presentation unit 30 of the tactile presentation apparatus 10 may include the deformation layer provided so as to cover the space, the actuator, the supply source and the pipe, which have been described in the first embodiment above, and the Peltier device serving as the temperature control unit described in the fourth embodiment above. Hereinafter, referring to FIG.

1, the description will be given using the reference signs described in the first embodiment.

As in the first embodiment, the tactile presentation system according to this example is a system for enabling mutual tactile communication to be performed even in a case where a plurality of users is located in places remote from each other. The tactile presentation system according to this example includes a plurality of tactile presentation apparatuses 10 each having a similar configuration. The tactile presentation apparatuses 10 are used by different users, respectively. Here, a case where the number of tactile presentation apparatuses 10 is two will be described.

Hereinafter, in order to especially distinguish the two tactile presentation apparatuses 10, one tactile presentation apparatus 10 will be referred to as a first tactile presentation apparatus 10a and another tactile presentation apparatus 10 will be referred to as a second tactile presentation apparatus 10b (see FIG. 1). Moreover, in order to distinguish the two users, the user who operates the first tactile presentation apparatus 10a will be referred to as a first user and the user who operates the second tactile presentation apparatus 10b will be referred to as a second user. Moreover, in the first tactile presentation apparatus 10a and the second tactile presentation apparatus 10b, in order to distinguish the respective units (e.g., the detection unit 20, the presentation unit 30) and the like having similar configurations, the wordings "first . . . " and "second . . . " will be used.

In this example, the tactile presentation apparatus 10 includes a detection unit 20 and a presentation unit 30.

As in the first embodiment, the detection unit 20 includes a pressure sensor 21.

The presentation unit 30 includes a space 31 that allows the fluid to flow out and in and the deformation layer 32 provided so as to cover the space 31, which have been described in the first embodiment above, and a Peltier device serving as the temperature control unit described in the fourth embodiment above. Moreover, the presentation unit 30 includes the supply source 33 that supplies the fluid, the actuator 34 that controls the flow of the fluid from/into the space 31 by its driving, and the pipe 35 connecting the space 31 and the supply source 33, which have been in the first embodiment above.

In the tactile presentation system according to this example, a second Peltier device of a second presentation unit 30b of the second tactile presentation apparatus 10b held by the second user is controlled to be a temperature depending on a first pressure value detected when the first user grips the first tactile presentation apparatus 10a. In addition, a second deformation layer of the second presentation unit 30b is controlled to expand/contract when the fluid flows from/into the space in accordance with the first pressure value.

Moreover, a first Peltier device of a first presentation unit 30a of the first tactile presentation apparatus 10a held by the first user is controlled to be a temperature depending on a second pressure value detected when the second user grips the second tactile presentation apparatus 10b. In addition, a first deformation layer of the first presentation unit 30a is controlled to expand/contract so that the fluid flows from/into the space in accordance with the second pressure value.

In this manner, in accordance with the pressure value detected by the one tactile presentation apparatus, the tactile sensation (force) presentation and the temperature presentation in the other tactile presentation apparatus may be performed. That is, without reproducing the temperature value detected by the one tactile presentation apparatus at the other tactile presentation apparatus as it is, the user force gripping the one tactile presentation apparatus may be reflected and the tactile sensation (force) may be presented to the user gripping the other tactile presentation apparatus, and it may be converted into the temperature and the temperature may be presented.

Accordingly, the temperature presentation using the Peltier device of the tactile presentation apparatus held by him/herself and the tactile sensation (force) presentation using the deformation layer enable the user on the receiving side to feel the gripping force of the user on the sending side more clearly.

In addition, as the gripping force increases, in other words, as the detected pressure value increases, the temperature presentation may be performed so that the temperature to be presented becomes higher. Moreover, the tactile sensation (force) presentation may be performed so that the expansion of the deformation layer increases as the detected pressure value increases. Hereinafter, a specific example will be described, though numeric values shown below are merely examples and not limitative.

When the first user grips the first tactile presentation apparatus 10a with a pressure value A, in the second tactile presentation apparatus 10b, the second Peltier device (temperature control unit) is controlled so that the temperature of the second deformation layer 32 increases by 1° C. For example, the second Peltier device is controlled so that the temperature of the second deformation layer 32 becomes 34° C. to 35° C. In addition, the second actuator 34 is controlled so that the fluid flow into the space at an inflow rate depending on the pressure value A, and the second deformation layer 32 expands.

When the first user further grips the first tactile presentation apparatus 10a with a pressure value B larger than the pressure value A, in the second tactile presentation apparatus 10b, the second Peltier device is controlled so that the temperature of the second deformation layer 32 increases by 2° C. For example, the second Peltier device is controlled so that the temperature of the second deformation layer 32 becomes 35° C. to 37° C. In addition, the second actuator 34 is controlled so that the fluid flows into the space at an inflow rate depending on the size of the pressure value B, and the second deformation layer 32 expands. The inflow rate of the fluid depending on the pressure value B is higher than the inflow rate depending on the pressure value A.

It should be noted that the use of the Peltier device enables a temperature change to be presented with lower power consumption and earlier response as compared to a heater. Accordingly, a change in operation of reducing or cancelling the gripping force of the tactile presentation apparatus from the user on the sending side can be quickly presented as a temperature change at the tactile presentation apparatus on the receiving side.

Moreover, the heater tends to take a longer time for reducing the temperature because the temperature lowers due to natural heat radiation. In contrast, the Peltier device is capable of heating and cooling. Therefore, it can also easily control lowering of the temperature and can present a desired temperature quickly.

Here, as described above, a vibration to the user can be presented by repeating the operation of causing the deformation layer 32 to expand/contract in a short period.

In this example, the example in which regarding the pressure value detected by the tactile presentation apparatus of the sending side, the force presentation, i.e., pressure presentation by expansion and contraction of the deformation layer of the tactile presentation apparatus on the receiving side is performed has been described. Alternatively or additionally, at the tactile presentation apparatus on the receiving side, the vibration tactile sensation may be presented by repeating the operation of causing the deformation layer to expand and contract. That is, the presentation unit may present the vibration tactile sensation to the user. The vibration emitted on the receiving side may be changed in accordance with the pressure value detected by the tactile presentation apparatus of the sending side. For example, as the detected pressure value increases at the tactile presentation apparatus of the sending side, expansion and contraction of the deformation layer may be controlled so that the vibration emitted by the tactile presentation apparatus on the receiving side becomes greater. The presentation of the vibration enables the user on the receiving side to feel the gripping force of the user on the sending side more clearly.

It should be noted that here, the example in which the vibration is presented to the user by repeating the operation of causing the deformation layer to expand and contract in a short period has been described, a vibration device that performs vibration tactile presentation may be provided in addition to the deformation layer and the presentation unit may include the vibration device. For example, a voice coil motor (VCM), a linear resonant actuator (LRA), an actuator using a piezoelectric element, or the like can be used as the vibration device.

In this manner, the presentation unit on the receiving side may change and present at least one tactile sensation of a pressure tactile sensation, a vibration tactile sensation, or a thermal tactile sensation in accordance with the user force on the sending side.

It should be noted that the present technology may also take the following configurations.

(1) A tactile presentation apparatus, including:
  a first detection unit that detects a first detection value based on a force of a first user;
  a first presentation unit that is provided at a position other than a position of the first detection unit and presents a tactile sensation to the first user; and
  a control unit that controls the first presentation unit to present a tactile sensation to the first user on the basis of a second detection value of another tactile presentation apparatus, the other tactile presentation apparatus including a second detection unit that detects a second detection value based on a force of a second user and a second presentation unit that presents a tactile sensation to the second user.

(2) The tactile presentation apparatus according to (1), in which
  the other tactile presentation apparatus controls, on the basis of the first detection value, a second presentation unit to present a tactile sensation to the second user.

(3) The tactile presentation apparatus according to (1) or (2), in which
  the first presentation unit is capable of expanding and contracting due to a fluid and presents a tactile sensation to the first user by the expansion and contraction.

(4) The tactile presentation apparatus according to (3), in which
  the first presentation unit includes
    a space that allows the fluid to flow out and in, and
    a deformation layer that covers the space and is capable of expanding and contracting due to the fluid flowing from and into the space.

(5) The tactile presentation apparatus according to (4), in which
  the first presentation unit includes a fluid pressure sensor that detects a pressure value of a fluid in the space.

(6) The tactile presentation apparatus according to (5), in which
  the control unit performs, on the basis of the pressure value of the fluid, at least one of safety control to suppress excessive expansion of the deformation layer or feedback control in expansion and contraction of the deformation layer.

(7) The tactile presentation apparatus according to any one of (4) to (6), in which
  the first presentation unit includes a distance sensor that measures a distance to the deformation layer.

(8) The tactile presentation apparatus according to (7), in which
  the control unit performs, on the basis of the distance, at least one of safety control to suppress excessive expansion of the deformation layer or feedback control in expansion and contraction of the deformation layer.

(9) The tactile presentation apparatus according to any one of (4) to (8), in which
  the first presentation unit includes a temperature control unit for controlling a temperature of the first presentation unit.

(10) The tactile presentation apparatus according to (9), in which
  the second detection unit of the other tactile presentation apparatus includes a temperature sensor that measures a temperature of the second detection unit, and
  the control unit controls, on the basis of information about the temperature of the second detection unit, the temperature control unit to control the temperature of the first presentation unit.

(11) The tactile presentation apparatus according to (9) or (10), in which
  the temperature control unit controls a temperature of the deformation layer.

(12) The tactile presentation apparatus according to (9) or (10), in which
  the temperature control unit controls a temperature of the fluid.

(13) The tactile presentation apparatus according to any one of (9) to (12), in which
  the deformation layer has thermal conductivity of 0.2 W/mK or more.

(14) The tactile presentation apparatus according to any one of (9) to (13), in which
  the first presentation unit further includes a temperature sensor that measures a temperature of the first presentation unit.

(15) The tactile presentation apparatus according to (14), in which
  the control unit performs, on the basis of the temperature of the first presentation unit, at least one of safety control to suppress excessive heating of the first presentation unit or feedback control in temperature control in the temperature control unit.

(16) The tactile presentation apparatus according to any one of (4) to (15), in which
  the control unit controls, on the basis of the second detection value, expansion and contraction of the deformation layer to control a tactile sensation to be presented to the first user.

(17) The tactile presentation apparatus according to any one of (1) to (16), in which
the first presentation unit includes a temperature control unit for controlling a temperature of the first presentation unit, and
the control unit controls, on the basis of the second detection value, the temperature control unit to control the temperature of the first presentation unit.

(18) The tactile presentation apparatus according to any one of (1) to (17), in which
the first detection unit is provided at a position corresponding to a finger of the first user, and
the first presentation unit is provided at a position corresponding to a palm of the first user.

(19) The tactile presentation apparatus according to (2), in which
the first detection unit includes
a deformation unit deformable due to a force of the first user, and
a pressure sensor that detects a force of the first user via the deformation unit as the first detection value.

(20) The tactile presentation apparatus according to any one of (1) to (19), in which
the first presentation unit presents a vibration tactile sensation to the first user.

(21) The tactile presentation apparatus according to (20), in which
the control unit controls, on the basis of the second detection value, a vibration to be presented to the first user.

(22) A tactile presentation system, including:
a tactile presentation apparatus including
a first detection unit that detects a first detection value based on a force of a first user,
a first presentation unit that is provided at a position other than a position of the first detection unit and presents a tactile sensation to the first user, and
a control unit that controls the first presentation unit to present a tactile sensation to the first user on the basis of a second detection value of another tactile presentation apparatus, the other tactile presentation apparatus including a second detection unit that detects a second detection value based on a force of a second user and a second presentation unit that presents a tactile sensation to the second user; and
the other tactile presentation apparatus.

(23) A tactile presentation control method, including
in a tactile presentation apparatus including a first detection unit that detects a first detection value based on a force of a first user and a first presentation unit that is provided at a position other than a position of the first detection unit and presents a tactile sensation to the first user,
controlling the first presentation unit to present a tactile sensation to the first user on the basis of a second detection value of another tactile presentation apparatus, the other tactile presentation apparatus including a second detection unit that detects a second detection value based on a force of a second user and a second presentation unit that presents a tactile sensation to the second user.

(24) A program that causes a tactile presentation apparatus including a first detection unit that detects a first detection value based on a force of a first user and a first presentation unit that is provided at a position other than a position of the first detection unit and presents a tactile sensation to the first user to perform processing including
controlling the first presentation unit to present a tactile sensation to the first user on the basis of a second detection value of another tactile presentation apparatus, the other tactile presentation apparatus including a second detection unit that detects a second detection value based on a force of a second user and a second presentation unit that presents a tactile sensation to the second user.

REFERENCE SIGNS LIST 5 control unit
10 to 19, 51, 52 tactile presentation apparatus
20 detection unit
30 presentation unit
100, 101 tactile presentation system

The invention claimed is:

1. A tactile presentation apparatus, comprising:
a first detection unit that detects a first detection value based on a force of a first user;
a first presentation unit that is provided at a position other than a position of the first detection unit and presents a tactile sensation to the first user; and
a control unit that controls the first presentation unit to present a tactile sensation to the first user on a basis of a second detection value of another tactile presentation apparatus, the other tactile presentation apparatus including a second detection unit that detects a second detection value based on a force of a second user and a second presentation unit that presents a tactile sensation to the second user,
wherein the first detection value includes a first detected pressure and a second detected pressure,
wherein the second detected pressure is greater than the first detected pressure, and
wherein the tactile sensation to the second user includes a temperature increase based on the first detection value.

2. The tactile presentation apparatus according to claim 1, wherein
the other tactile presentation apparatus controls, on a basis of the first detection value, a second presentation unit to present a tactile sensation to the second user.

3. The tactile presentation apparatus according to claim 2, wherein
the first detection unit includes
a deformation unit deformable due to a force of the first user, and
a pressure sensor that detects a force of the first user via the deformation unit as the first detection value.

4. The tactile presentation apparatus according to claim 1, wherein
the first presentation unit is capable of expanding and contracting due to a fluid and presents a tactile sensation to the first user by the expansion and contraction.

5. The tactile presentation apparatus according to claim 4, wherein
the first presentation unit includes
a space that allows the fluid to flow out and in, and
a deformation layer that covers the space and is capable of expanding and contracting due to the fluid flowing from and into the space.

6. The tactile presentation apparatus according to claim 5, wherein the first presentation unit includes a fluid pressure sensor that detects a pressure value of a fluid in the space.

7. The tactile presentation apparatus according to claim 6, wherein
the control unit performs, on a basis of the pressure value of the fluid, at least one of safety control to suppress excessive expansion of the deformation layer or feedback control in expansion and contraction of the deformation layer.

8. The tactile presentation apparatus according to claim 5, wherein
the first presentation unit includes a distance sensor that measures a distance to the deformation layer.

9. The tactile presentation apparatus according to claim 8, wherein
the control unit performs, on a basis of the distance, at least one of safety control to suppress excessive expansion of the deformation layer or feedback control in expansion and contraction of the deformation layer.

10. The tactile presentation apparatus according to claim 5, wherein
the first presentation unit includes a temperature control unit for controlling a temperature of the first presentation unit.

11. The tactile presentation apparatus according to claim 10, wherein
the second detection unit of the other tactile presentation apparatus includes a temperature sensor that measures a temperature of the second detection unit, and
the control unit controls, on a basis of information about the temperature of the second detection unit, the temperature control unit to control the temperature of the first presentation unit.

12. The tactile presentation apparatus according to claim 10, wherein
the temperature control unit controls a temperature of the deformation layer.

13. The tactile presentation apparatus according to claim 10, wherein
the temperature control unit controls a temperature of the fluid.

14. The tactile presentation apparatus according to claim 5, wherein
the control unit controls, on a basis of the second detection value, expansion and contraction of the deformation layer to control a tactile sensation to be presented to the first user.

15. The tactile presentation apparatus according to claim 10, wherein
the first presentation unit further includes a temperature sensor that measures a temperature of the first presentation unit.

16. The tactile presentation apparatus according to claim 15, wherein
the control unit performs, on a basis of the temperature of the first presentation unit, at least one of safety control to suppress excessive heating of the first presentation unit or feedback control in temperature control in the temperature control unit.

17. The tactile presentation apparatus according to claim 1, wherein
the first presentation unit includes a temperature control unit for controlling a temperature of the first presentation unit, and
the control unit controls, on a basis of the second detection value, the temperature control unit to control the temperature of the first presentation unit.

18. The tactile presentation apparatus according to claim 1, wherein the temperature increase is by 1° C. to the second user based on the first detected pressure of the first detection value.

19. The tactile presentation apparatus according to claim 1, wherein the temperature increase is by 2° C. to the second user based on the second detected pressure of the first detection value.

20. A tactile presentation system, comprising:
a tactile presentation apparatus including
a first detection unit that detects a first detection value based on a force of a first user,
a first presentation unit that is provided at a position other than a position of the first detection unit and presents a tactile sensation to the first user, and
a control unit that controls the first presentation unit to present a tactile sensation to the first user on a basis of a second detection value of another tactile presentation apparatus, the other tactile presentation apparatus including a second detection unit that detects a second detection value based on a force of a second user and a second presentation unit that presents a tactile sensation to the second user; and
the other tactile presentation apparatus,
wherein the first detection value includes a first detected pressure and a second detected pressure,
wherein the second detected pressure is greater than the first detected pressure, and
wherein the tactile sensation to the second user includes a temperature increase based on the first detection value.

21. A tactile presentation control method, comprising
in a tactile presentation apparatus including a first detection unit that detects a first detection value based on a force of a first user and a first presentation unit that is provided at a position other than a position of the first detection unit and presents a tactile sensation to the first user,
controlling the first presentation unit to present a tactile sensation to the first user on a basis of a second detection value of another tactile presentation apparatus, the other tactile presentation apparatus including a second detection unit that detects a second detection value based on a force of a second user and a second presentation unit that presents a tactile sensation to the second user,
wherein the first detection value includes a first detected pressure and a second detected pressure,
wherein the second detected pressure is greater than the first detected pressure, and
wherein the tactile sensation to the second user includes a temperature increase based on the first detection value.

22. A program that causes a tactile presentation apparatus including a first detection unit that detects a first detection value based on a force of a first user and a first presentation unit that is provided at a position other than a position of the first detection unit and presents a tactile sensation to the first user to perform processing comprising
controlling the first presentation unit to present a tactile sensation to the first user on a basis of a second detection value of another tactile presentation apparatus, the other tactile presentation apparatus including a second detection unit that detects a second detection value based on a force of a second user and a second presentation unit that presents a tactile sensation to the second user, wherein the first detection value includes a first detected pressure and a second detected pressure,
wherein the second detected pressure is greater than the first detected pressure, and
wherein the tactile sensation to the second user includes a temperature increase based on the first detection value.

\* \* \* \* \*